(12) United States Patent
Rokita et al.

(10) Patent No.: US 12,071,887 B2
(45) Date of Patent: Aug. 27, 2024

(54) ENGINE ASSEMBLY FOR A VEHICLE HAVING A HYDROCARBON TRAP

(71) Applicant: BRP-ROTAX GMBH & CO. KG, Gunskirchen (AT)

(72) Inventors: Ralf Rokita, Bad Wimsbach-Neydharting (AT); Matthias Zarhuber, Thalheim bei Wels (AT); Christian Raffelsberger, Scharnstein (AT); Heinz Kusel, Pennewang (AT); Nigel Foxhall, Semriach (AT); Markus Doppelbauer, Gunskirchen (AT); Thomas Zorn, Stadl-Paura (AT); Christian Schwab, Gratwein-Strassengel (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 18/255,917

(22) PCT Filed: Dec. 17, 2021

(86) PCT No.: PCT/EP2021/086426
§ 371 (c)(1),
(2) Date: Jun. 5, 2023

(87) PCT Pub. No.: WO2022/129482
PCT Pub. Date: Jun. 23, 2022

(65) Prior Publication Data
US 2024/0044274 A1      Feb. 8, 2024

Related U.S. Application Data

(60) Provisional application No. 63/126,671, filed on Dec. 17, 2020.

(51) Int. Cl.
*F01N 9/00*     (2006.01)
*F01N 1/08*     (2006.01)
(Continued)

(52) U.S. Cl.
CPC ............... *F01N 9/00* (2013.01); *F01N 1/083* (2013.01); *F01N 1/165* (2013.01); *F01N 3/28* (2013.01); *F01N 2900/08* (2013.01)

(58) Field of Classification Search
CPC . F01N 9/00; F01N 1/083; F01N 1/165; F01N 1/166; F01N 3/28; F01N 3/2066;
(Continued)

(56) References Cited

U.S. PATENT DOCUMENTS

| 10,487,714 B2* | 11/2019 | Uhrich ...................... F01N 3/10 |
| 11,773,810 B2* | 10/2023 | Cronin ............... B01J 20/28011 123/519 |

(Continued)

FOREIGN PATENT DOCUMENTS

WO    2019101981 A1    11/2018

OTHER PUBLICATIONS

International Search Report of PCT/EP2021/086426 isssued from ISA/EP; Marc Zebst; dated Mar. 25, 2022.

*Primary Examiner* — Dapinder Singh
(74) *Attorney, Agent, or Firm* — BCF LLP

(57) ABSTRACT

An engine assembly for a vehicle includes an internal combustion engine and an exhaust system. The exhaust system includes a catalytic converter, a main muffler, a hydrocarbon trap, a pre-muffler disposed upstream from the main muffler and the hydrocarbon trap, and an exhaust path valve. The exhaust path valve is movable between first and second exhaust path positions. The exhaust path valve obstructs a second exhaust path in the first exhaust path position such that exhaust gas flows from an exhaust port of
(Continued)

an engine cylinder to the catalytic converter to the main muffler and to the atmosphere. The exhaust path valve obstructs a first exhaust path in the second exhaust path position such that exhaust gas flows from the exhaust port of the engine cylinder to the catalytic converter to the hydrocarbon trap and to the atmosphere.

19 Claims, 23 Drawing Sheets

(51) Int. Cl.
  *F01N 1/16* (2006.01)
  *F01N 3/28* (2006.01)
(58) Field of Classification Search
  CPC ...... F01N 3/035; F01N 3/0807; F01N 3/0814; F01N 3/101; F01N 3/103; F01N 3/2892; F01N 3/2882; F01N 13/009; F01N 13/08; F01N 2900/08; F01N 2550/02; F01N 2410/00; F02M 26/15; F02M 26/35; F02M 27/00; F02M 27/02; Y02T 10/12; Y02T 10/40; Y02A 50/20
  See application file for complete search history.

(56) References Cited

U.S. PATENT DOCUMENTS

| | | | |
|---|---|---|---|
| 2010/0011746 A1* | 1/2010 | Lupescu | F02M 26/35 60/299 |
| 2010/0043410 A1 | 2/2010 | Wakao et al. | |
| 2010/0196241 A1* | 8/2010 | Girdlestone | B01D 53/8696 422/177 |
| 2011/0061371 A1 | 3/2011 | Cavataio | |

\* cited by examiner

ENGINE ASSEMBLY FOR A VEHICLE HAVING A HYDROCARBON TRAP

CROSS-REFERENCE

The present application claims priority from U.S. Provisional Patent Application No. 63/126,671, filed Dec. 17, 2020, the entirety of which is incorporated by reference herein.

FIELD OF TECHNOLOGY

The present technology relates to engine assemblies for vehicles, and in particular to engine assemblies having hydrocarbon traps.

BACKGROUND

Two-stroke internal combustion engines are used in various vehicles, particularly in recreational vehicles such as snowmobiles and all-terrain vehicles (ATVs). While two-stroke engines offer good performance and are typically lighter than four-stroke engines, they are also known for discharging a greater amount of noxious emissions than four-stroke engines. In order to counteract this issue, engines (including two-stroke and four-stroke engines) are sometimes paired with a catalytic converter that reduces the quantity of noxious emissions discharged through the vehicle's exhaust system. Catalytic converters typically have to reach a "light-off" temperature at which a catalytic reaction begins within the catalytic converter to reduce noxious emissions. Thus, until that temperature is reached, the catalytic converter does not reduce the amount of noxious emissions discharged by the exhaust system of the vehicle when the engine is running.

To address this, for some four-stroke engines, hydrocarbon traps are provided in the exhaust system to trap hydrocarbons contained in exhaust gas as it flows through the hydrocarbon trap. However, in some cases, depending on the vehicle, hydrocarbon traps may be limited in size which can negatively affect their performance. Furthermore, hydrocarbons collected within the hydrocarbon trap can saturate the hydrocarbon trap.

There is therefore a desire for an engine assembly that addresses at least in part the above drawbacks.

SUMMARY

It is an object of the present technology to ameliorate at least some of the inconveniences present in the prior art.

According to one aspect of the present technology, there is provided an engine assembly for a vehicle. The engine assembly includes an internal combustion engine including: a crankcase; a crankshaft disposed at least in part in the crankcase; and a cylinder block connected to the crankcase, the cylinder block defining at least one cylinder, each of the at least one cylinder defining an exhaust port for discharging exhaust gas therefrom. The engine assembly also includes an exhaust system for discharging exhaust gas from the engine, the exhaust system defining a first exhaust path and a second exhaust path separate from one another. The exhaust system includes: a catalytic converter in fluid communication with the exhaust port of the at least one cylinder to receive exhaust gas therefrom; a main muffler downstream from and in selective fluid communication with the catalytic converter, the main muffler defining at least in part the first exhaust path; a hydrocarbon trap downstream from and in selective fluid communication with the catalytic converter, the hydrocarbon trap defining at least in part the second exhaust path, the hydrocarbon trap including a hydrocarbon trapping material to adsorb hydrocarbon from exhaust gas flowing therethrough; a pre-muffler disposed upstream from the main muffler and the hydrocarbon trap, the pre-muffler defining a pre-muffler chamber, the catalytic converter being in fluid communication with the pre-muffler chamber such that exhaust gas flows from the catalytic converter to the pre-muffler chamber before flowing through one of the first exhaust path and the second exhaust path; and at least one exhaust path valve operable to selectively obstruct the first exhaust path and the second exhaust path to prevent exhaust gas from the catalytic converter flowing through the first exhaust path and the second exhaust path respectively, the pre-muffler enclosing the at least one exhaust path valve, each of the at least one exhaust path valve being movable between a first exhaust path position and a second exhaust path position, the at least one exhaust path valve obstructing the second exhaust path in the first exhaust path position such that exhaust gas flows from the exhaust port of the at least one cylinder to the catalytic converter to the main muffler and to the atmosphere, the at least one exhaust path valve obstructing the first exhaust path in the second exhaust path position such that exhaust gas flows from the exhaust port of the at least one cylinder to the catalytic converter to the hydrocarbon trap and to the atmosphere.

In some embodiments, the pre-muffler chamber is a first pre-muffler chamber; the pre-muffler defines a second pre-muffler chamber in fluid communication with the first pre-muffler chamber; an outlet of the catalytic converter opens into the first pre-muffler chamber; and the at least one exhaust path valve is disposed in the second pre-muffler chamber.

In some embodiments, the pre-muffler includes an acoustic dampening material.

In some embodiments, the pre-muffler also includes: a pre-muffler housing having an inner surface and an outer surface; and a metallic mesh disposed inside the pre-muffler housing, the acoustic dampening material being disposed between the inner surface of the pre-muffler housing and the metallic mesh.

In some embodiments, the pre-muffler also includes: a muffler conduit to fluidly connect the pre-muffler to the main muffler; and a trap conduit to fluidly connect the pre-muffler to the hydrocarbon trap; in the first exhaust path position, the at least one exhaust path valve blocks an inlet of the trap conduit; and in the second exhaust path position, the at least one exhaust path valve blocks an inlet of the muffler conduit.

In some embodiments, the at least one exhaust path valve is pivotable between the first exhaust path position and the second exhaust path position.

In some embodiments, the at least one exhaust path valve is a single exhaust path valve including: a valve shaft pivotable about a valve shaft axis; a first plate member connected to the valve shaft, the first plate member blocking the inlet of the trap conduit in the first exhaust path position of the exhaust path valve; and a second plate member connected to the valve shaft opposite the first plate member, the second plate member blocking the inlet of the muffler conduit in the second exhaust path position of the exhaust path valve.

In some embodiments, the muffler conduit has a first diameter; the trap conduit has a second diameter; and the first diameter is greater than the second diameter.

In some embodiments, the exhaust system also includes a valve actuator operatively connected to the at least one exhaust path valve to move the at least one exhaust path valve between the first exhaust path position and the second exhaust path position; the engine assembly also includes a controller in communication with the valve actuator to control movement of the at least one exhaust path valve therethrough; and the controller is operable to control the valve actuator to move the at least one exhaust path valve to be in the first exhaust path position or the second exhaust path position based at least partly on at least one of: a rate of fuel consumption of the engine; a temperature of a part of the engine assembly; an amount of time elapsed since starting of the engine; an amount of oxygen contained in exhaust gas discharged by the engine; and a position of a throttle valve of an air intake system of the engine assembly.

In some embodiments, the controller is operable to control the valve actuator to move the at least one exhaust path valve to be in the first exhaust path position or the second exhaust path position based at least partly on the temperature of the part of the engine assembly.

In some embodiments, the part of the engine assembly is the catalytic converter.

In some embodiments, the exhaust system also includes an exhaust pipe fluidly connected between the catalytic converter and the exhaust port of the engine, the exhaust pipe comprising an expanding section, a diameter of the exhaust pipe increasing along the expanding section as the exhaust pipe extends away from the exhaust port of the at least one cylinder.

In some embodiments, the hydrocarbon trap has an exhaust inlet and an exhaust outlet for receiving and discharging exhaust gas respectively, the hydrocarbon trap including: a trap housing defining the exhaust inlet and the exhaust outlet of the hydrocarbon trap; and a sleeve enclosed at least in part by the trap housing, the sleeve housing the hydrocarbon trapping material, the sleeve defining a passage for flow of exhaust gas therethrough as exhaust gas flows from the exhaust inlet to the exhaust outlet of the hydrocarbon trap.

In some embodiments, the sleeve has a first end and a second end opposite one another, the hydrocarbon trap also including: a sleeve support member disposed at the first end of the sleeve, the sleeve support member comprising at least one opening for allowing flow therethrough; and a biasing element connected to the sleeve support member, the biasing element compressing the hydrocarbon trapping material between the first end and the second end of the sleeve.

In some embodiments, the sleeve is a first sleeve, the passage being a first passage; the hydrocarbon carbon trapping material of the hydrocarbon trap comprises a first portion and a second portion; the first sleeve houses the first portion of the hydrocarbon trapping material; the hydrocarbon trap also includes a second sleeve enclosed at least in part by the trap housing, the second sleeve housing the second portion of the hydrocarbon trapping material, the second sleeve defining a second passage for flow of exhaust gas therethrough as exhaust gas flows from the exhaust inlet to the exhaust outlet of the hydrocarbon trap; and the first passage and the second passage are fluidly connected in series such that, when the at least one exhaust path valve is in the second exhaust path position, exhaust gas flows through the first sleeve and the second sleeve subsequently.

In some embodiments, in use, when the at least one exhaust path valve is in the second exhaust path position, exhaust gas subsequently flows: into the exhaust inlet of the hydrocarbon trap; within the trap housing outside of the first and second sleeves toward the exhaust outlet of the hydrocarbon trap; into the first passage of the first sleeve toward the exhaust inlet of the hydrocarbon trap; into the second passage of the second sleeve toward the exhaust outlet of the hydrocarbon trap; and out of the exhaust outlet of the hydrocarbon trap into the atmosphere.

In some embodiments, the first sleeve has a first center axis; and the second sleeve has a second center axis extending parallel to the first center axis.

In some embodiments, the first sleeve has a first sleeve inlet end and a first sleeve outlet end, exhaust gas flowing into the first sleeve through the first sleeve inlet end and flowing out of the first sleeve through the first sleeve outlet end; the second sleeve has a second sleeve inlet end a second sleeve outlet end, exhaust gas flowing into the second sleeve through the second sleeve inlet end and flowing out of the second sleeve through the second sleeve outlet end; the first sleeve inlet end is adjacent to the second sleeve outlet end; and the first sleeve outlet end is adjacent to the second sleeve inlet end.

In some embodiments, the engine assembly also includes: an air intake system fluidly connected to the engine to feed air to the engine; and a purging conduit fluidly connected to the second exhaust path upstream from the hydrocarbon trap, the purging conduit being fluidly connected to the air intake system to permit air flow from the hydrocarbon trap into the air intake system via the purging conduit.

In some embodiments, the engine assembly also includes a connecting conduit fluidly connecting the pre-muffler to the hydrocarbon trap, the connecting conduit defining in part the second exhaust path, wherein: the purging conduit extends from the connecting conduit; and a diameter of the connecting conduit is greater than a diameter of the purging conduit.

In some embodiments, the engine assembly also includes a purge valve operable to selectively fluidly communicate the air intake system with the second exhaust path via the purging conduit, the purge valve being movable between an exhaust position and a purging position. In the exhaust position: the purge valve blocks flow through the purging conduit; the at least one exhaust path valve is in the second exhaust path position in order for exhaust gas to flow out of the exhaust system through the second exhaust path. In the purging position: the purge valve allows flow through the purging conduit; the at least one exhaust path valve is in the first exhaust path position in order for exhaust gas to flow out of the exhaust system through the first exhaust path; and ambient air is drawn into the second exhaust path via the hydrocarbon trap and flows to the air intake system via the purging conduit thereby providing the air intake system with hydrocarbon purged from the hydrocarbon trap.

In some embodiments, each of the at least one cylinder defines an intake port; the air intake system comprises a compressor in fluid communication with the intake port of the at least one cylinder and with the purging conduit; and pressure produced by the compressor causes ambient air to be drawn into the second exhaust path via the hydrocarbon trap when the purge valve is in the purging position.

In some embodiments, the compressor is a roots-type compressor.

In some embodiments, each the at least one cylinder defines an intake port; and the crankcase is not in fluid communication with the intake port of the at least one cylinder.

In some embodiments, the engine operates on a two-stroke engine cycle.

In some embodiments, a vehicle includes the engine assembly.

According to another aspect of the present technology, there is provided a method for operating an exhaust system of an engine assembly for a vehicle. The exhaust system defines a first exhaust path and a second exhaust path. The exhaust system includes: a catalytic converter; a main muffler downstream from and in selective fluid communication with the catalytic converter, the main muffler defining at least in part the first exhaust path; a hydrocarbon trap downstream from and in selective fluid communication with the catalytic converter, the hydrocarbon trap defining at least in part the second exhaust path, the hydrocarbon trap comprising a hydrocarbon trapping material to adsorb hydrocarbon from exhaust gas flowing therethrough. The method includes: determining at least one operational parameter of the engine assembly; and selectively obstructing the first exhaust path and the second exhaust path based on the at least one operational parameter of the engine assembly, the first exhaust path being open when the second exhaust path is obstructed, the second exhaust path being open when the first exhaust path is obstructed, exhaust gas flowing from the catalytic converter to the main muffler and to the atmosphere in response to the second exhaust path being obstructed, exhaust gas flowing from the catalytic converter to the hydrocarbon trap and to the atmosphere in response to the first exhaust path being obstructed.

In some embodiments, the at least one operational parameter of the engine assembly includes at least one of: a rate of fuel consumption of the engine; a temperature of a part of the engine assembly; an amount of time elapsed since starting of the engine; an amount of oxygen contained in exhaust gas discharged by the engine; and a position of a throttle valve of an air intake system of the engine assembly.

In some embodiments, the engine assembly also includes: an air intake system fluidly connected to the engine to feed air to the engine; and a purging conduit fluidly connected to the second exhaust path upstream from the hydrocarbon trap, the purging conduit being fluidly connected to the air intake system. The method also includes: obstructing flow through the purging conduit in response to the first exhaust path being obstructed; and permitting flow through the purging conduit in response to the second exhaust path being obstructed in order to draw ambient air into the second exhaust path via the hydrocarbon trap to provide the air intake system with hydrocarbon purged from the hydrocarbon trap.

In some embodiments, selectively obstructing the first exhaust path and the second exhaust path includes moving at least one exhaust path valve between a first exhaust path position and a second exhaust path position, the at least one exhaust path valve obstructing the second exhaust path in the first exhaust path position such that exhaust gas flows from the catalytic converter to the main muffler and to the atmosphere, the at least one exhaust path valve obstructing the first exhaust path in the second exhaust path position such that exhaust gas flows from the catalytic converter to the hydrocarbon trap and to the atmosphere.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
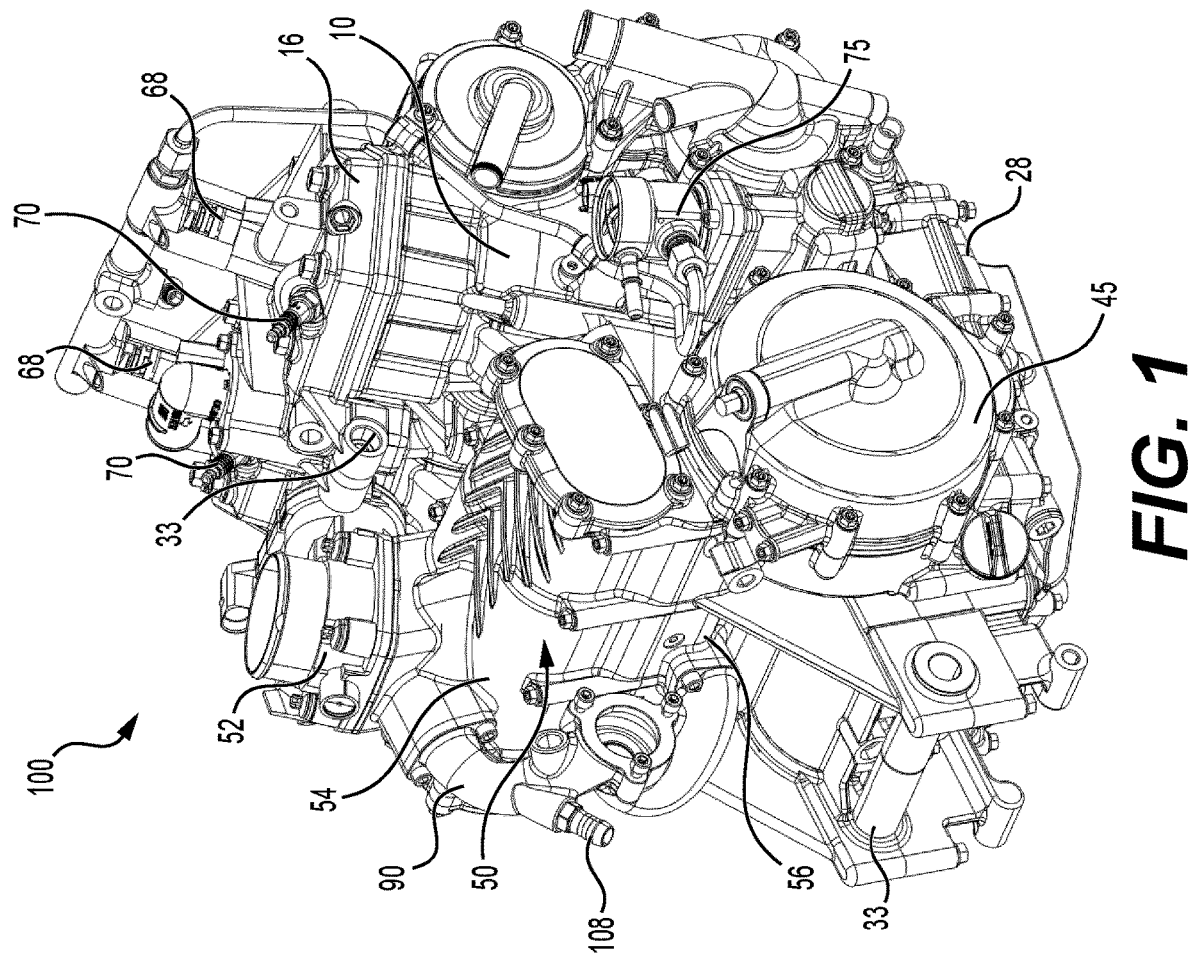
FIG. 1 is a perspective view, taken from a top, rear, right side, of an engine assembly including a two-stroke internal combustion engine.
Figure 2:
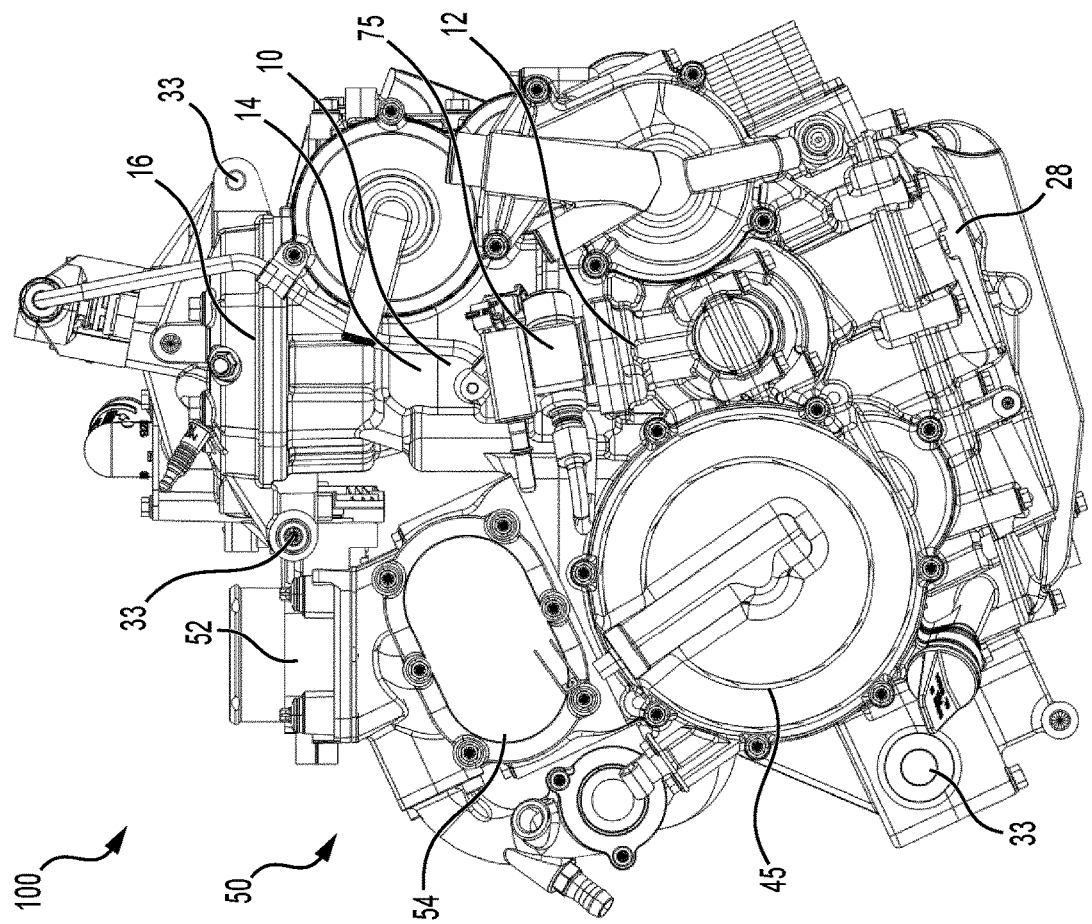
FIG. 2 is a right side elevation view of the engine assembly of FIG. 1.
Figure 3:
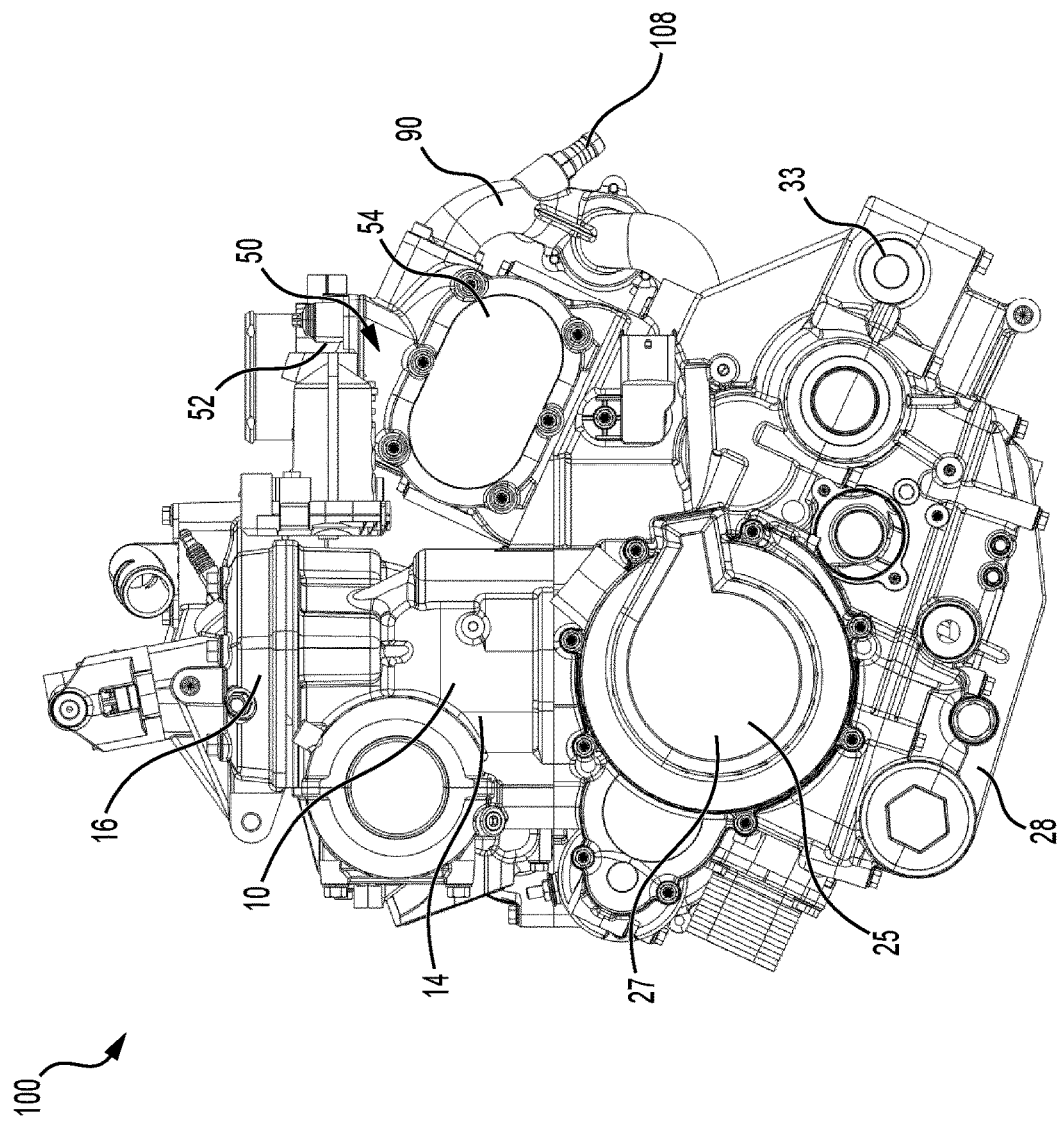
FIG. 3 is a left side elevation view of the engine assembly of FIG. 1.

The present technology will be described below with respect to a direct fuel injection, two-stroke, inline, two-cylinder internal combustion engine. It is contemplated that at least some aspects of the present technology could be provided on a two-stroke internal combustion engine that is carbureted or has semi-direct injection, that has cylinders arranged in a V-type or other arrangement, and/or that has only one or more than two cylinders.

FIGS. 1 to 5 illustrate an engine assembly 100 including an internal combustion engine 10 for a vehicle. The vehicle may be a snowmobile, an all-terrain vehicle (ATV), or any other suitable vehicle. In this embodiment, the engine 10 is part of a frame of the vehicle such that the engine 10 supports in part a load carried by the vehicle 10. The engine 10 operates on a two-stroke engine cycle such that the engine 10 completes a power cycle with two strokes (an upstroke and a downstroke) of the engine's pistons. The engine 10 can thus be referred to as a two-stroke engine. The engine 10 has a crankcase 12, a cylinder block 14 connected on top of the crankcase 12 and a cylinder head 16 connected on top of the cylinder block 14.

Figure 8:
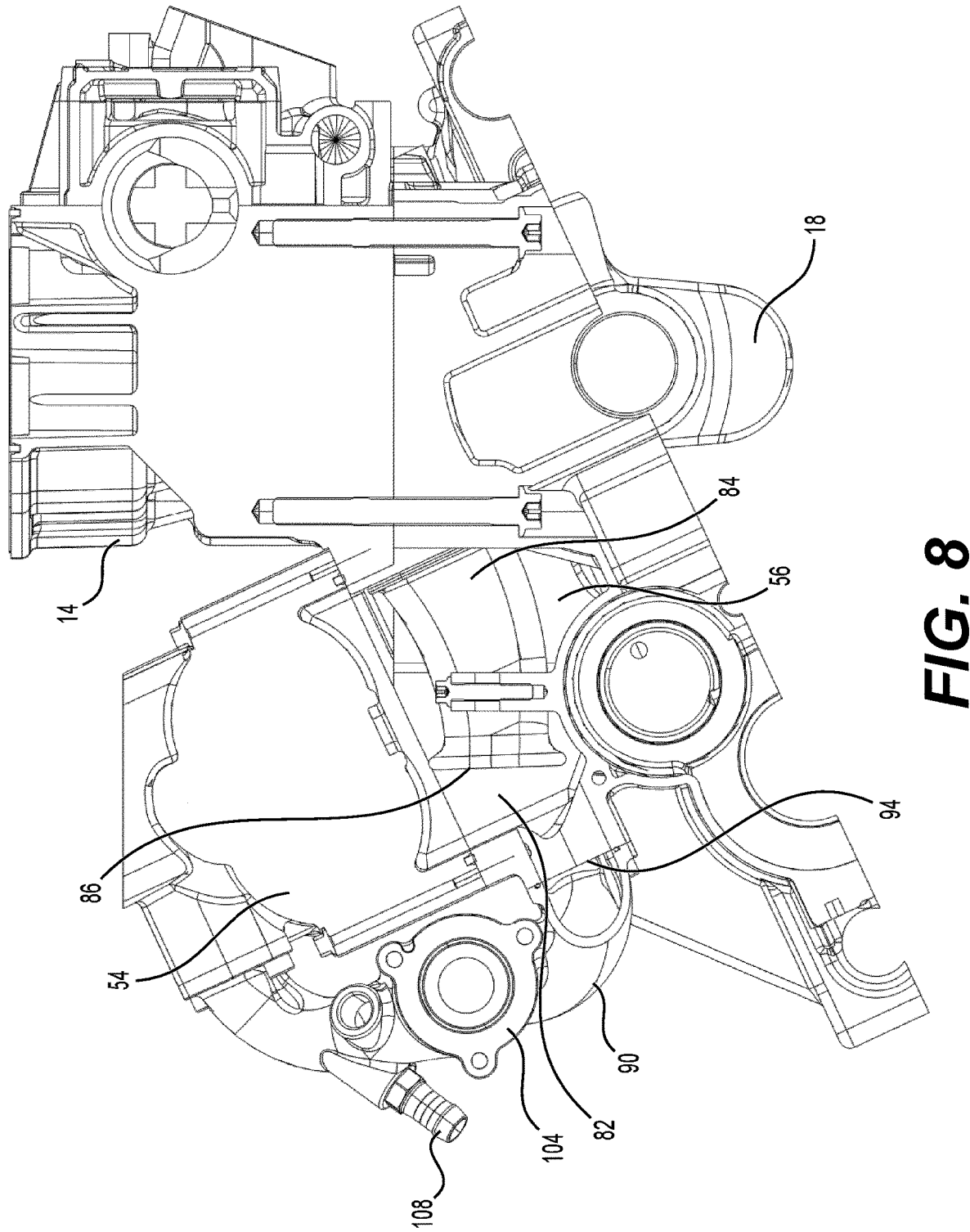
FIG. 8 is a cross-sectional view of the part of the engine and the air intake system of FIG. 6 taken along line 8-8 in FIG. 5.

The crankcase 12 rotationally supports a crankshaft 18 (shown in FIG. 8). The crankshaft 18 has a portion disposed inside the crankcase 12 and an end 19 extending outside the crankcase 12. The end 19 of the crankshaft 18 connects to a transmission of a vehicle or another mechanical component to be driven by the engine 10. As such, the side of the engine from which the end 19 of the crankshaft 18 protrudes is referred to herein as the power take-off side of the engine 10. It is contemplated that the crankshaft 18 may not have the end 19 protruding from the crankcase 12 and that instead the engine 10 could have another shaft, called output shaft, rotationally supported by the crankcase 12 and driven by the crankshaft 18. In such an implementation, it is the output shaft that protrudes from the crankcase 12 and is connected to the mechanical component to be driven by the engine 10. It is contemplated that the output shaft could be coaxial with or offset from the crankshaft 18.

Figure 4:
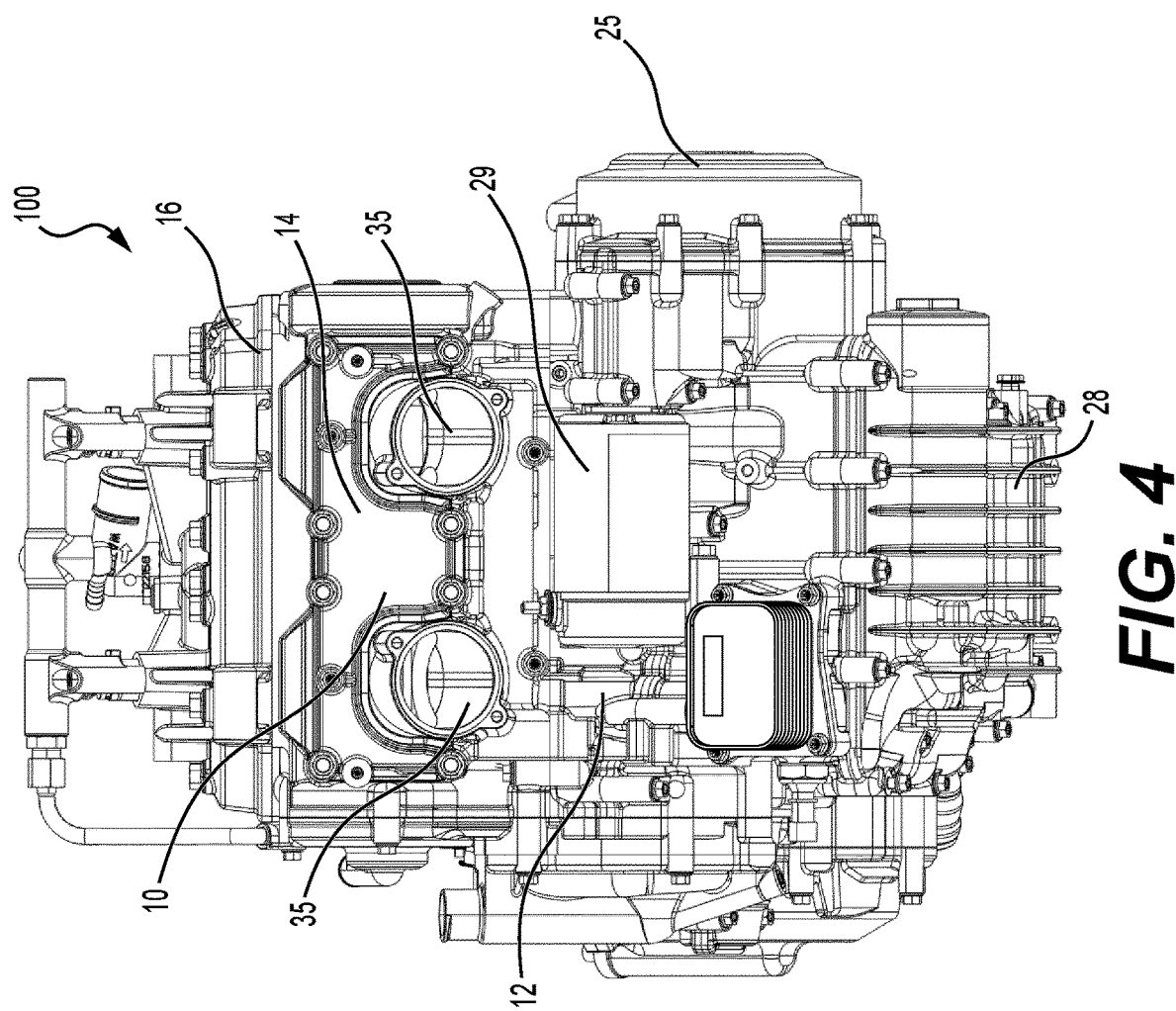
FIG. 4 is a front elevation view of the engine assembly of FIG. 1.
Figure 5:
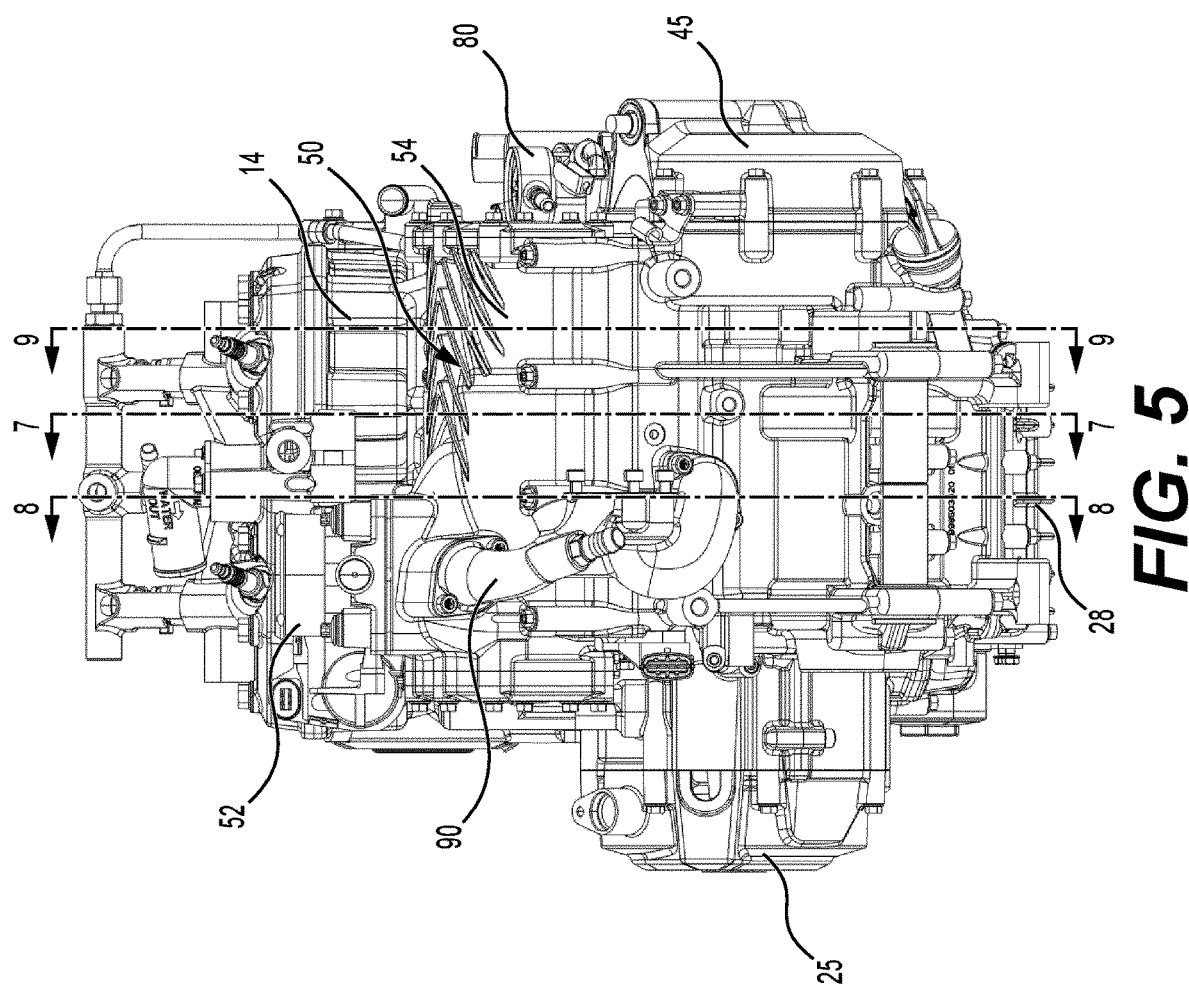
FIG. 5 is a rear elevation view of the engine assembly of FIG. 1.

A generator 25 is connected to the side of the crankcase 12 opposite the power take-off side. The generator 25 uses power produced by the engine 10 to generate electrical energy for storage in a battery (not shown). A generator housing 27 encloses the generator 25 therein. As shown in FIG. 4, an electric starter motor 29 is also connected to the side of the crankcase 12. The starter motor 29 selectively engages the crankshaft 18 via gears (not shown) to cause the crankshaft 18 to turn before the engine 10 can run on its own as a result of the internal combustion process in order to start the engine 10.

An oil pump (not shown) is fluidly connected to various parts of the engine 10 to circulate oil through the engine 10. The oil pump pumps oil from an oil reservoir 28 connected to a bottom of the crankcase 12. The oil pumped by the oil pump is distributed to the various components of the engine 10 that need lubrication. The oil then falls back by gravity inside the oil reservoir 28. In this embodiment, the oil pump is mechanically driven.

Figure 6:
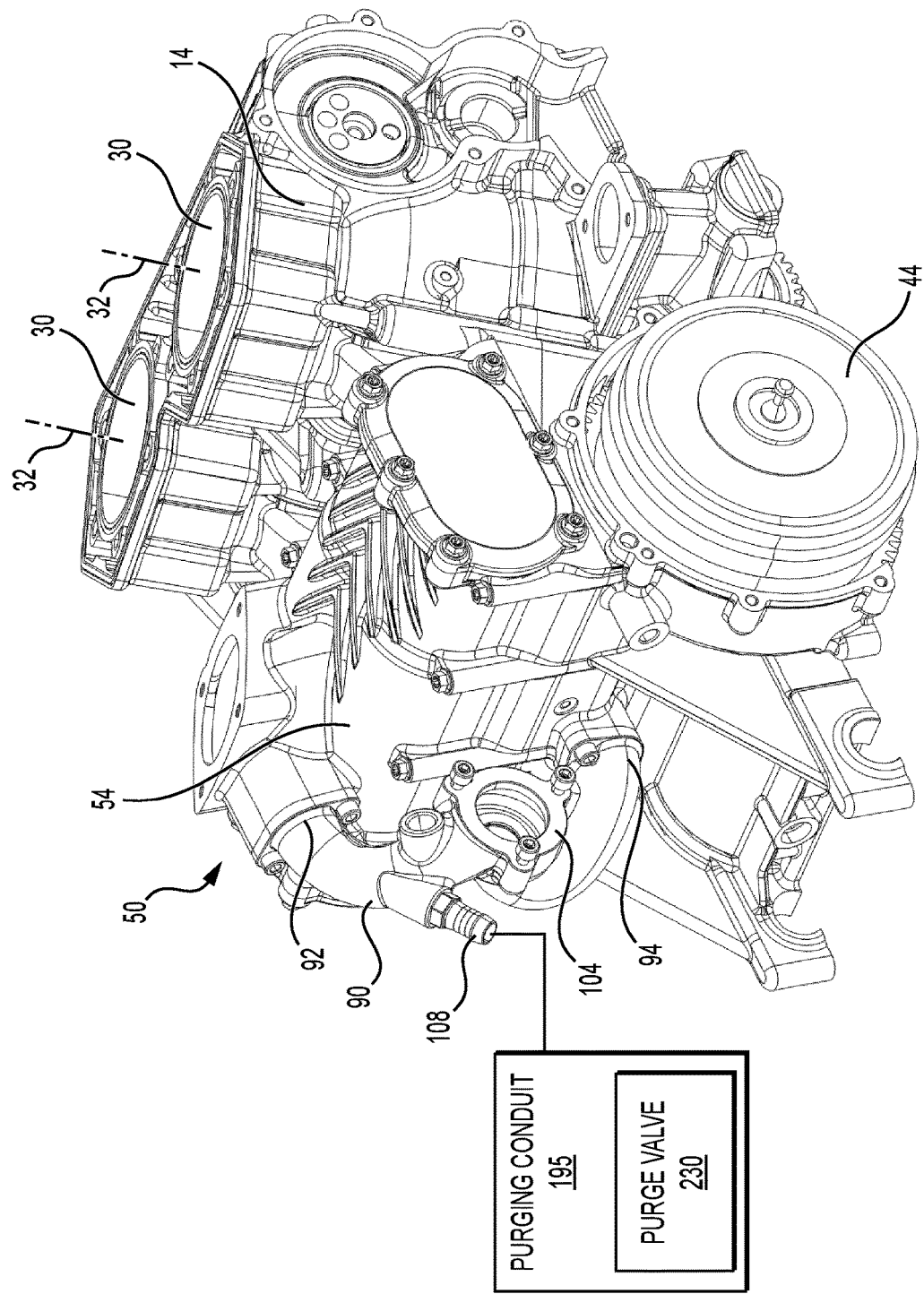
FIG. 6 is a perspective view, taken from a top, rear, right side, of part of the engine assembly of FIG. 1, including part of a crankcase and a cylinder block of the engine, and an air intake system.

As shown in FIG. 6, the cylinder block 14 defines two cylinders 30 adjacent to one another in a lateral direction of the engine 10. Each cylinder 30 defines a cylinder axis 32 along which the cylinder 30 extends. The engine 10 has two pistons (not shown) each of which is disposed within a corresponding one of the cylinders 30. During operation of the engine 10, each piston moves along the cylinder axis 32 of its corresponding cylinder 30 in a reciprocating motion including an upstroke (whereby the piston moves toward an upper end of the cylinder 30) and a downstroke (whereby the piston moves away from the upper end of the cylinder 30). Each piston is connected to the crankshaft 18 by a connecting rod (not shown) so as to rotate the crankshaft 18 during the upstroke and downstroke of the piston.

Figure 7:
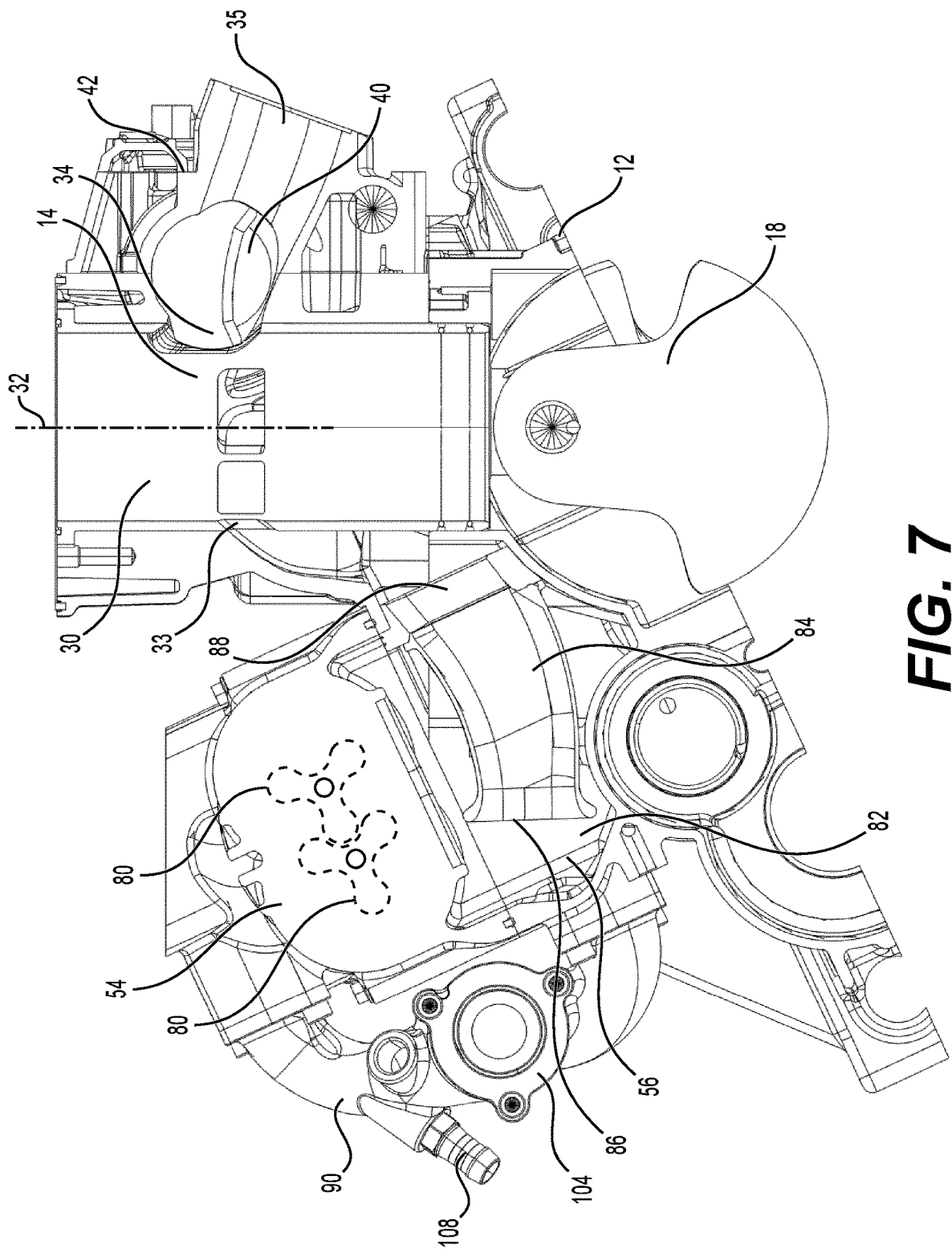
FIG. 7 is a cross-sectional view of the part of the engine and the air intake system of FIG. 6 taken along line 7-7 in FIG. 5.

With reference to FIG. 7, each cylinder 30 defines an intake port 33 for receiving intake air therein and an exhaust port 34 for discharging exhaust fluids from the cylinder 30. The cylinder block 14 defines part of an exhaust passage 35 for each cylinder 30 extending from a corresponding one of the exhaust ports 34. As partially shown in FIG. 7, the engine 10 has a rotating exhaust valve assembly 40 configured to control the opening and closing of the exhaust ports 34 of the cylinders 30 such as to allow or impede passage of exhaust fluids from the cylinders 30 to the exhaust passages 35. The exhaust valve assembly 40 is enclosed between a cover member 42 and the cylinder block 14 which together define a housing within which the exhaust valve assembly 40 is at least partly contained. In this implementation, the cover member 42 also defines part of the exhaust passages 35 in connection with the portion of the exhaust passages 35 defined by the cylinder block 14. The configuration of the exhaust valve assembly 40 and the manner in which it functions is described in detail in International Patent Application Publication No. WO 2019/101981, filed on Nov. 26, 2018, the entirety of which is incorporated by reference herein.

In this implementation, each cylinder 30 has a single exhaust port 34 in that the cylinder 30 does not have any other exhaust ports. However, it is contemplated that, in alternative implementations, each cylinder 30 could define auxiliary exhaust ports that fluidly communicate with the exhaust passage 35. For example, such auxiliary exhaust ports could be disposed on either side of the exhaust port 34. It is also contemplated that each cylinder 30 could have only one or more than two auxiliary exhaust ports.

As will be described further below with reference to FIGS. 12 to 24, the engine assembly 100 also includes an exhaust system 60 for discharging exhaust gas from the engine 10. Notably, the exhaust system 60 includes an exhaust manifold 62 connected to the cylinder block 14 at the exhaust passages 35. The exhaust manifold 62 has two inlets 64 in alignment with the two exhaust passages 35 and a single outlet 66.

The cylinder head 16 closes the tops of the cylinders 30 such that for each cylinder a variable volume combustion chamber is defined between the cylinder 30, its corresponding piston and the cylinder head 16. As can be seen in FIG. 1, two fuel injectors 68 and two spark plugs 70 (one of each per cylinder 30) are connected to the cylinder head 16. The fuel injectors 68 inject fuel directly in the combustion chambers. The spark plugs 70 ignite the fuel-air mixture in the combustion chambers. A high-pressure direct injection fuel pump 75 is disposed on the power take-off side of the engine 10 and is fluidly connected to the fuel injectors 68.

Figure 11:
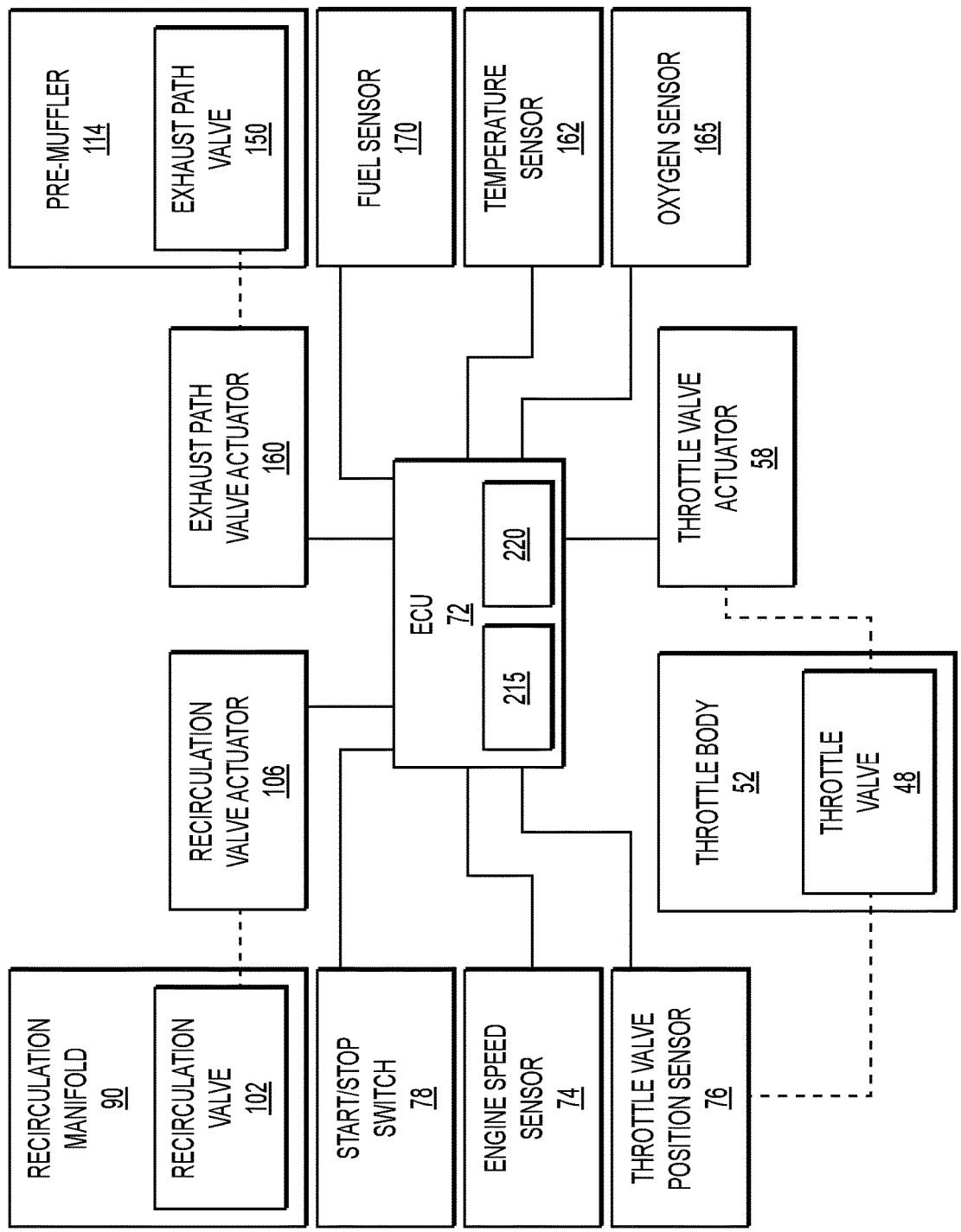
FIG. 11 is a block diagram of an electronic control unit (ECU) of the engine assembly of FIG. 1 and associated components in communication therewith.

The operation of the fuel injectors 68, the spark plugs 70, the starter motor and the oil pump is controlled by an electronic control unit (ECU) 72 that is schematically illustrated in FIG. 11. The ECU 72 controls these components based on signals received from various sensors and components, some of which are illustrated schematically in FIG. 11. For instance, an engine speed sensor 74 senses a speed of rotation of the crankshaft 18 and sends a signal representative of engine speed to the ECU 72. A throttle valve position sensor 76 senses the position of a throttle valve 48 configured to regulate the flow of air into the engine 10. It is contemplated that the engine 10 could include more than one throttle valve 48 in alternative implementations. The throttle valve position sensor 76 sends a signal representative of the position of the throttle valve 48 to the ECU 72. A start/stop switch 78 sends a signal to the ECU 72 to start the engine 10 when the engine 10 is stopped and to stop the engine 10 when the engine 10 is running. It is contemplated that the start/stop switch 78 could be separated into a start switch and a separate stop switch. It is contemplated that the start/stop switch 78 could be incorporated into an ignition key assembly or could be a separate button.

As shown in FIG. 11, the ECU 72 has a processor unit 215 for carrying out executable code, and a non-transitory memory unit 220 that stores the executable code in a non-transitory medium (not shown) included in the memory unit 220. The processor unit 215 includes one or more processors for performing processing operations that implement functionality of the ECU 72. The processor unit 215 may be a general-purpose processor or may be a specific-purpose processor comprising one or more preprogrammed hardware or firmware elements (e.g., application-specific integrated circuits (AS ICs), electrically erasable programmable read-only memories (EEPROMs), etc.) or other related elements. The non-transitory medium of the memory unit 220 may be a semiconductor memory (e.g., read-only memory (ROM) and/or random-access memory (RAM)), a magnetic storage medium, an optical storage medium, and/or any other suitable type of memory. While the ECU 72 is represented as being one control unit in this implementation, it is understood that the ECU 72 could comprise separate control units for controlling components separately and that at least some of these control units could communicate with each other.

As shown in FIG. 1, the engine assembly 100 has an air intake system 50 for providing intake air to the engine 10. The air intake system 50 includes a throttle body 52, a compressor 54 fluidly connected to the throttle body 52 to receive intake air therefrom, and a plenum 56 fluidly connecting the compressor 54 to the cylinders 30 of the engine 10.

The throttle body 52 is provided to regulate the amount of intake air admitted into the air intake system 50. Notably, as shown in FIG. 11, the throttle valve 48 is disposed within the throttle body 52 and is actuated by a throttle valve actuator 58, controlled by the ECU 72, to adjust the amount of air admitted into the air intake system 50. The ECU 72 controls the throttle valve actuator 58 based on one or more inputs, including for example a sensed position of a throttle control (e.g., a pedal) operated by the driver of the vehicle.

The compressor 54 is configured to receive intake air from the throttle body 52 and pump it into the cylinders 30 via the plenum 56. The compressor 54 therefore avoids having to introduce oil from the crankcase of the engine 10 into the air-fuel mixture that is routed to the cylinders 30, notably unlike conventional two-stroke engines in which the intake air is compressed within the crankcase of the engine. In this embodiment, the compressor 54 is a roots-type compressor. That is, the compressor 54 is a positive displacement compressor that operates by pumping air with a pair of meshing lobes 80 (shown in dashed lines in FIG. 7). In this embodiment, the compressor 54 generates a boost pressure of approximately 700 mbar. Furthermore, as can be seen, in this embodiment, the compressor 54 is positioned below the throttle body 52 and forwardly of the cylinder block 14 of the engine 10.

Figure 9:
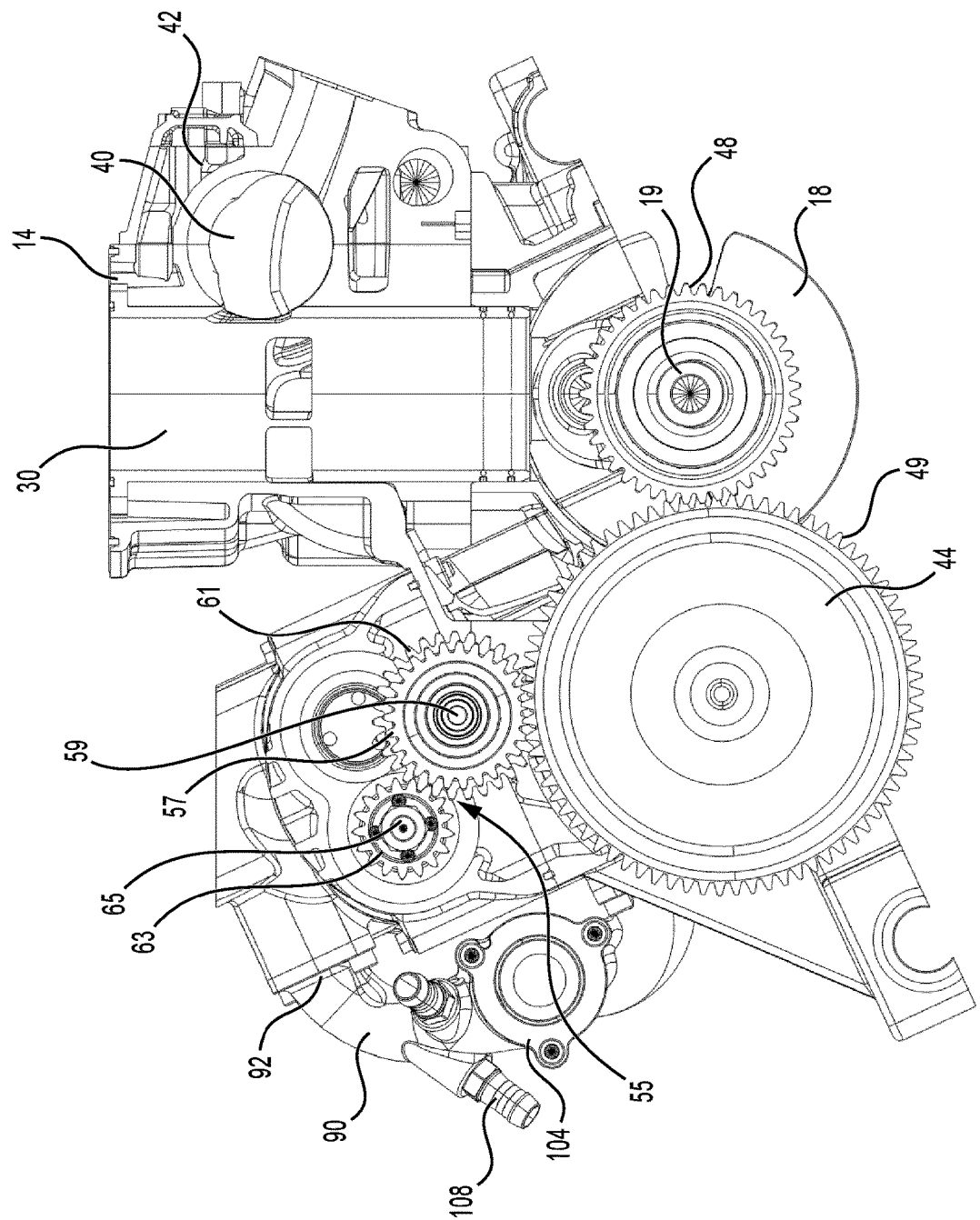
FIG. 9 is a cross-sectional view of the part of the engine and the air intake system of FIG. 6 taken along line 9-9 in FIG. 5.
Figure 10:
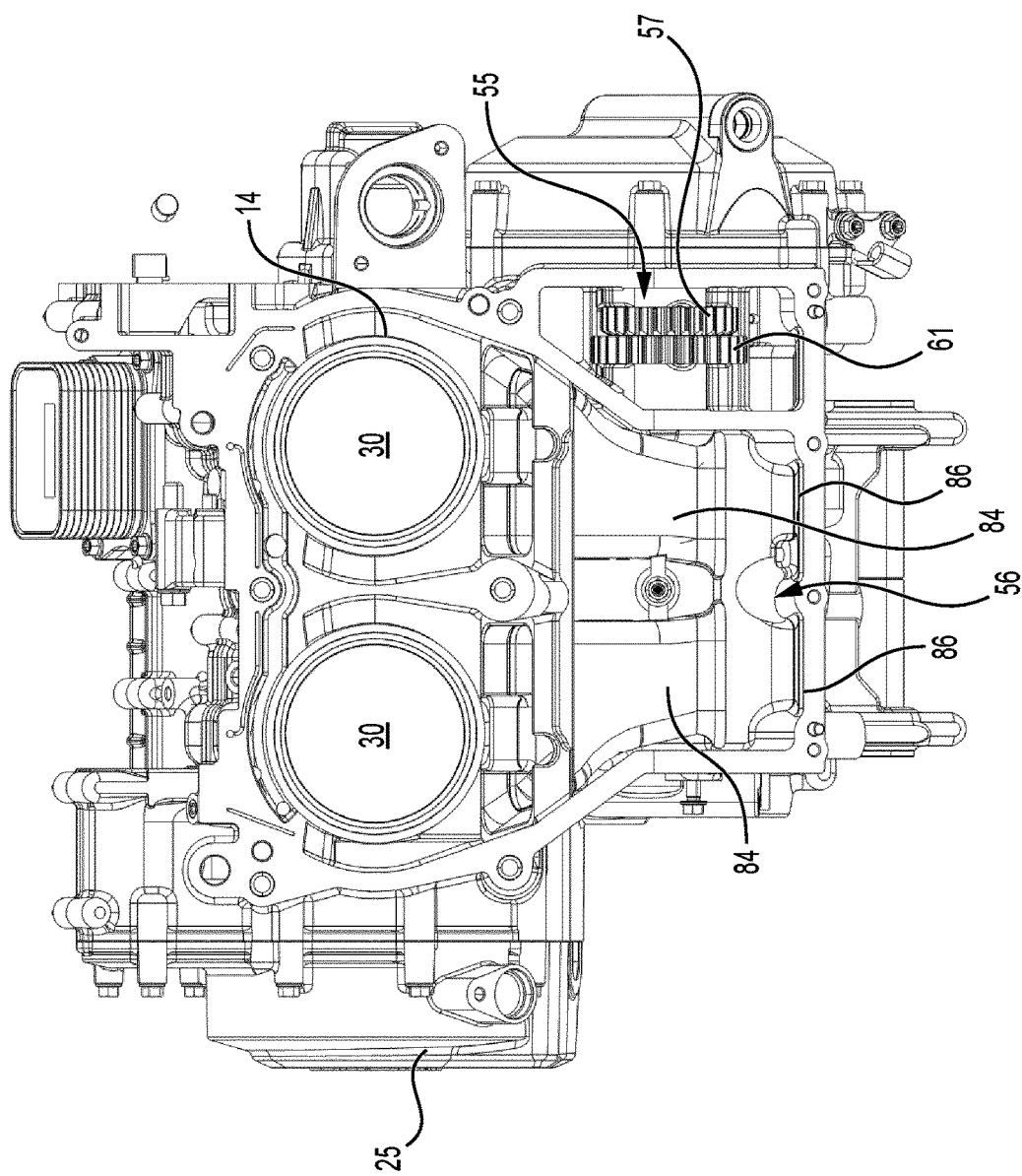
FIG. 10 is a top plan view of part of the engine with a compressor thereof removed to expose a plenum of the air intake system of FIG. 6.

In order to drive the compressor 54 (i.e., cause rotation of its lobes 80), the compressor 54 is operatively connected to the crankshaft 18. Notably, as will be described below with reference to FIG. 9, a gearing assembly 55 operatively connects the compressor 54 to the crankshaft 54. Starting at the crankshaft 18, a driving gear 48 is mounted thereto at the end 19 of the crankshaft 18. The driving gear 48 is meshed with a gear 49 such that the driving gear 48 and the gear 49 rotate about parallel axes. The gear 49 is housed within a clutch housing 45 (FIGS. 1, 2 and 5) and thus may be referred to as a "clutch gear". A clutch 44 is operatively connected to the clutch gear 49. The clutch gear 49 drives the gearing assembly 55 of the compressor 54 to cause the compressor 54 to pump the intake air fed thereto. Notably, the clutch gear 49 drivingly engages a first intermediate gear 57 of the gearing assembly 55. The first intermediate gear 57 is mounted to a gear shaft 59 of the gearing assembly 55 to rotate therewith. A second intermediate gear 61 mounted to the gear shaft 59 drivingly engages an input gear 63 mounted to an input shaft 65 of the compressor 54. A first lobe 80 (FIG. 7) of the compressor 54 is mounted to the input shaft 65 and thus rotation of the input gear 63, which drives the input shaft 65, causes the first lobe 80 to rotate which also causes rotation of a second lobe 80 (FIG. 7) of the compressor 54.

The plenum 56 is disposed below the compressor 54 and is fluidly connected thereto. The plenum 56 defines a chamber 82 that receives compressed air from the compressor 54. The plenum 56 encloses two runners 84 within the chamber 82. Each runner 84 has an inlet end 86 and an outlet end 88. For each runner 84, the inlet end 86 thereof opens into the chamber 82 of the plenum 56 while the outlet end 88 is fluidly connected to the intake port 33 of a respective one of the cylinders 30. Thus, in operation, compressed air from the compressor 54 is routed to the plenum 56 where it enters the runners 84 and into the intake ports 33 of the cylinders 30.

In this embodiment, the runners 84 are relatively long. Notably, a length of each runner 84 measured in a straight line from the inlet end 86 to the outlet end 88 is significant. In particular, a ratio of the length of one of the runners 84 over a diameter of the corresponding cylinder 30 (to which that runner 84 is fluidly connected) is between 1 and 1.4. More particularly, in this embodiment, the ratio of the length of one of the runners 84 over the diameter of the corresponding cylinder 30 is approximately 1.2 (±0.1). As will be explained in detail below, the significant length of the runners 84 delays the flow of air from the plenum 56 into the cylinders 30 in order to help establish the timing to provide efficient scavenging of the engine 10.

As can be understood from the above, the crankcase 12 is not in fluid communication with the intake ports 33 of the cylinders 30 as the air intake system 50 feeds intake air directly into the intake ports 33 without the air passing through the crankcase 12. This is in contrast with a conventional two-stroke engine in which intake air is typically routed into the crankcase before flowing, through a transfer port, into a respective cylinder of the engine.

Returning now to FIG. 6, a recirculation manifold 90 is provided to selectively increase intake air flow into the compressor 54. Increasing air flow into the compressor 54 can be helpful to avoid excessively pressurizing the engine 10 which could cause damage thereto, for instance when the engine 10 is operating under low load. In particular, because the compressor 54 is a positive displacement compressor, providing greater mass air flow thereto translates into a lower pressure ratio of the compressor 54 (i.e., a ratio of the output pressure of air discharged by the compressor 54 over the input pressure of air flowing into the compressor 54). The recirculation manifold 90 is fluidly connected to the inlet of the compressor 54 and is thus fluidly connected thereby to the throttle body 52. In particular, the recirculation manifold 90 has an outlet end 92 connected to the inlet of the compressor 54 and an inlet end 94 connected to the plenum 56.

As shown schematically in FIG. 11, a recirculation valve 102 is disposed in the recirculation manifold 90 to selectively open or block the recirculation manifold 90 between the inlet end 94 and the outlet end 92 thereof. Notably, as shown in FIG. 6, a socket 104 is provided to connect a recirculation valve actuator 106 to the recirculation manifold 90. The recirculation valve actuator 106 is operatively connected to the recirculation valve 102 to actuate the recirculation valve 102 between an open and a closed position. In the open position of the recirculation valve 102, a portion of the air present in the plenum 56 flows through the recirculation manifold 90 back to the inlet of the compressor 54 and thus does not enter the runners 84. The recirculation valve 102 is placed in the open position when the engine 10 is operating under partial load (e.g., low load). In contrast, in the closed position of the recirculation valve 102, all of the air present in the plenum 56 enters the runners 84 and flows into the engine 10. The recirculation valve 102 is placed in the closed position when the load demand on the engine 10 increases (i.e., when the driver actuates the throttle control to cause the throttle valve 48 to open to a greater degree).

In this embodiment, as shown in FIG. 11, the recirculation valve actuator 106 is controlled by the ECU 72. Notably, the ECU 72 is in communication with the recirculation valve actuator 106 to control movement of the recirculation valve 102 between its open and closed positions. It is contemplated that the recirculation valve actuator 106 could be controlled by a separate controller in other embodiments. Furthermore, in this embodiment, the ECU 72 controls the position of the throttle valve 48 in part as a function of the position of the recirculation valve 102. Notably, since opening and closing the recirculation valve 102 causes a fluctuation in air mass flow to the engine 10, the ECU 72 adjusts the position of the throttle valve 48 based in part on the position of the recirculation valve 102 in order to keep air mass flow to the engine 10 constant and thereby maintain its performance. For instance, in response to the recirculation valve 102 being placed in the open position, the throttle valve 48 is controlled to increase air flow through the throttle body 52 and thereby increase air flow into the engine 10 to compensate for the portion of air flowing through the recirculation manifold 90. On the other hand, in response to the recirculation valve 102 being placed in the closed position, the throttle valve 48 is controlled to decrease air flow through the throttle body 52 and thereby decrease air flow into the engine 10 to compensate for the portion of air that will stop flowing into the recirculation manifold 90 from the plenum 56 and instead be routed into the engine 10. This may avoid an unexpected boost in power when the operator slowly increases the throttle. The compensation of the position of the throttle valve 48 on the basis of the position of the recirculation valve 102 may be omitted in case of a rapid throttle change by the operator.

Returning to FIG. 6, the recirculation manifold 90 also has a purge connector 108 that is configured to fluidly connect part of the exhaust system 60 to the recirculation manifold 90. The function of this connection will be described in detail further below.

Figure 12:
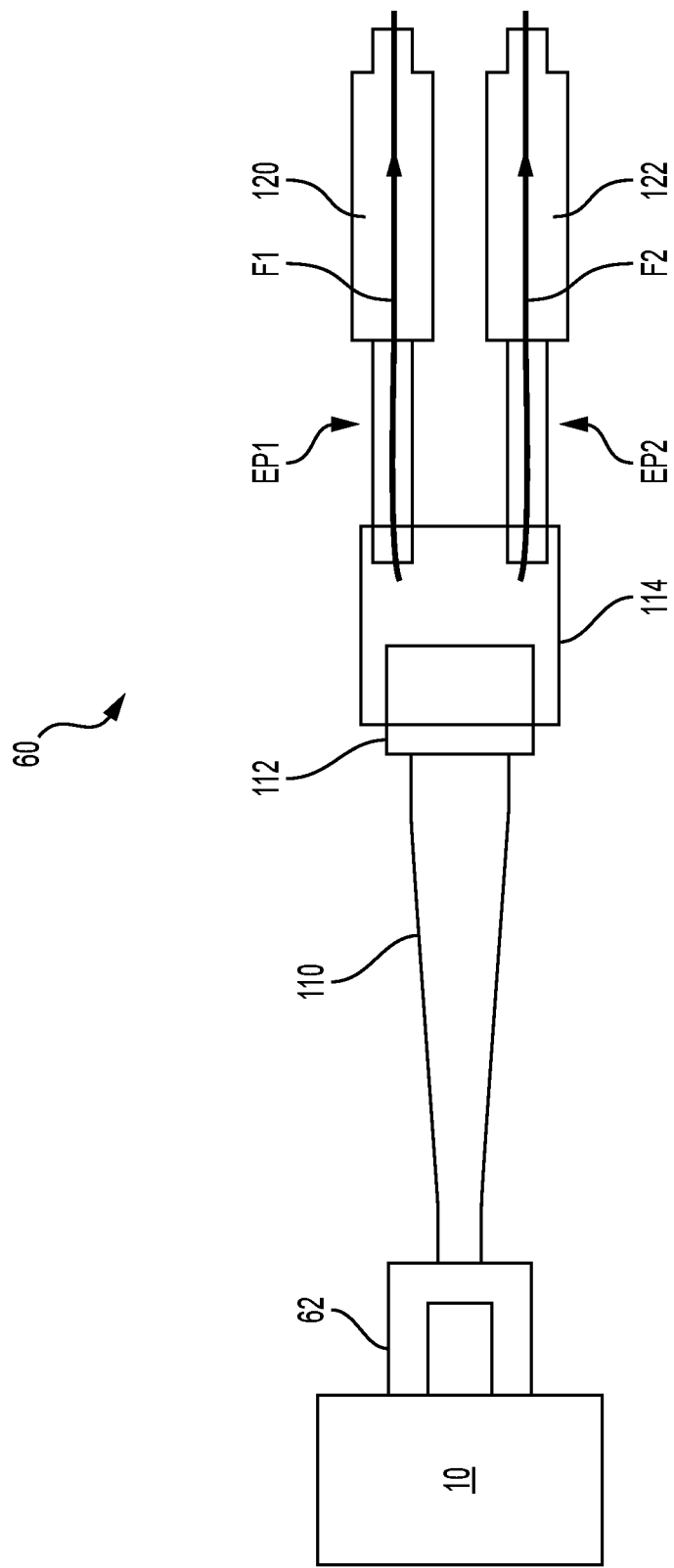
FIG. 12 is a schematic representation of an exhaust system of the engine assembly of FIG. 1.

The exhaust system 60 will now be described in greater detail with reference to FIGS. 12 to 24. As mentioned above, the exhaust system 60 includes the exhaust manifold 62 which receives exhaust gas from the exhaust ports 34 of the cylinders 30. As shown in FIG. 12, the exhaust system 60 also includes an exhaust pipe 110, a catalytic converter 112 (sometimes simply referred to as a "catalyst") fluidly connected to and downstream from the exhaust pipe 110, and a pre-muffler 114 fluidly connected to and downstream from the catalytic converter 112. As will be explained in detail below, the exhaust system 60 defines two separate exhaust paths EP1, EP2 that diverge from one another at the pre-muffler 114 so that exhaust gas can be selectively routed from the pre-muffler 114 to one of the exhaust paths EP1, EP2 based on one or more operating conditions of the engine assembly 100. Notably, the first exhaust path EP1 is defined in part by a main muffler 120 of the exhaust system 60 while the second exhaust path EP2 is defined in part by a hydrocarbon trap 122 of the exhaust system 60. The main muffler 120 is configured to dampen noise generated by the engine 10. On the other hand, the hydrocarbon trap 122 is configured to adsorb hydrocarbon from exhaust gas flowing therethrough. Notably, as will be described below, the hydrocarbon trap 122 is used during a period in which the catalytic converter 112 has not yet reached a "light-off" temperature at which the catalytic reaction therein begins to reduce noxious emissions in the exhaust gas flowing therethrough. The manner in which the exhaust system is controlled to route exhaust gas to the main muffler 120 or the hydrocarbon trap 122 will be described in detail below.

Figure 13:
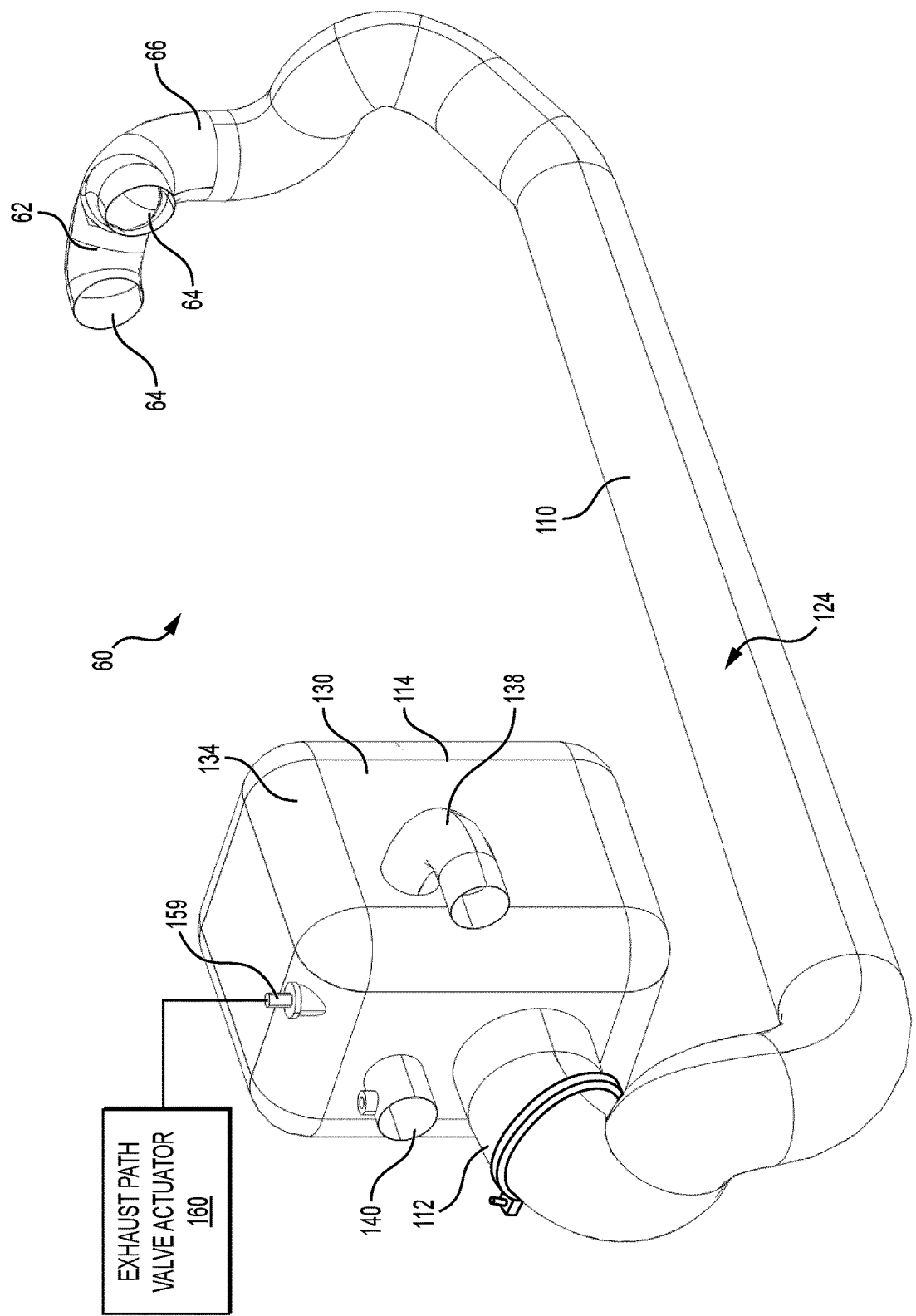
FIG. 13 is a perspective view, taken from a rear, right side, of part of the exhaust system of FIG. 12, including a pre-muffler thereof.
Figure 14:
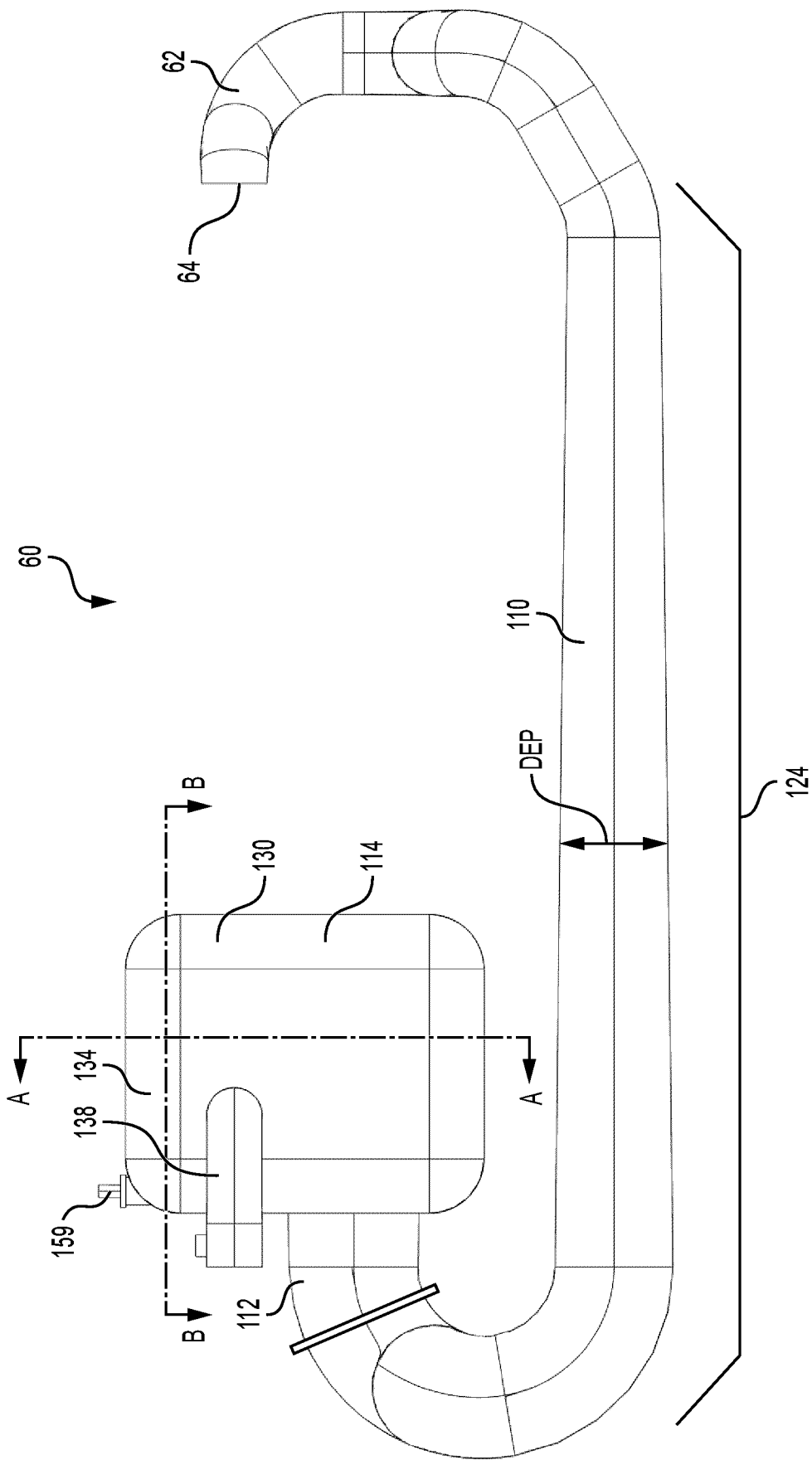
FIG. 14 is a right side elevation view of the part of the exhaust system of FIG. 13.

As shown in FIGS. 12 and 13, the exhaust pipe 110 is fluidly connected between the catalytic converter 112 and the exhaust manifold 62. With particular reference to FIG. 14, the exhaust pipe 110 has an expanding section 124 along which a diameter DEP of the exhaust pipe 110 increases as the exhaust pipe 110 extends away from the exhaust ports 34 of the cylinders 30. In other words, along the expanding section 124, the diameter DEP of the exhaust pipe 110 increases in a direction of the catalytic converter 112 (i.e., a direction of an outlet of the exhaust pipe 110). The increasing diameter of the exhaust pipe 110 along the expanding section 124 creates a suction effect to draw exhaust gas out of the cylinders 30. This can prevent fresh intake air provided by the intake system 50 from "shortcutting" the cylinders 30 (i.e., from flowing out of the cylinders 30 and into the exhaust pipe 110), leaving residual combusted gas within the cylinders 30.

In a conventional two-stroke engine, the downward movement of the engine's pistons opens the exhaust ports of the cylinders and pumps intake air from the chamber housing the crankshaft through respective transfer ports into the combustion chambers defined by the cylinders. To provide proper scavenging (i.e., replacing the exhaust gas in the cylinder with fresh air or fresh air-fuel mixture), the various intake and exhaust ports are positioned so that fresh air enters the combustion chambers some time after exhaust gas has been discharged therefrom. Therefore, the scavenging of the engine is sensitive to engine speed since it is dependent on the speed of the pistons. Moreover, the tuned exhaust pipe for such a conventional two-stroke engine has a converging section, along which the diameter of the tuned exhaust pipe decreases as the exhaust pipe extends away from the exhaust ports of the cylinders (i.e., decreasing in the direction of flow). This converging section generates backpressure waves to prevent fresh uncombusted gas from being discharged from the cylinders of the engine. Since the speed of the backpressure waves is dependent on the temperature of the exhaust gas discharged by the engine, the tuned exhaust pipe is optimized for an operating temperature of the engine.

Unlike in conventional two-stroke engines which rely on the movement of the pistons to pump air into the combustion chambers, in the present embodiment, the compressor 54 continuously pumps air into the cylinders 30. As mentioned above, the significant length of the runners 84 delays the flow of intake air into the combustion chambers defined by the cylinders 30 so as to establish proper timing for efficient scavenging. Moreover, during the upward motion of the pistons, the exhaust valve assembly closes the exhaust ports 34 of the cylinders 30 before the pistons cover the exhaust ports 34, thereby preventing the loss of fresh air and fuel from the combustion chambers. As such, unlike typical tuned pipes, the exhaust pipe 110 does not have a converging section along which the diameter DEP of the exhaust pipe 110 decreases in the direction of flow of the exhaust gas. Therefore, by the above-described configuration, the scavenging of the engine is less sensitive to the speed and temperature of the engine 10 and therefore may be optimal within a greater range thereof.

The catalytic converter 112 is an exhaust emission control device that, through chemical reactions, converts some compounds of the exhaust gas emitted by the engine 10 to less polluting compounds. The catalytic converter 112 is in fluid communication with the exhaust ports 34 of the cylinders 30 through the exhaust pipe 110 and the exhaust manifold 62. A person skilled in the art understands the basic construction of a catalytic converter and therefore the catalytic converter 112 will not be described in detail herein.

Figure 15:
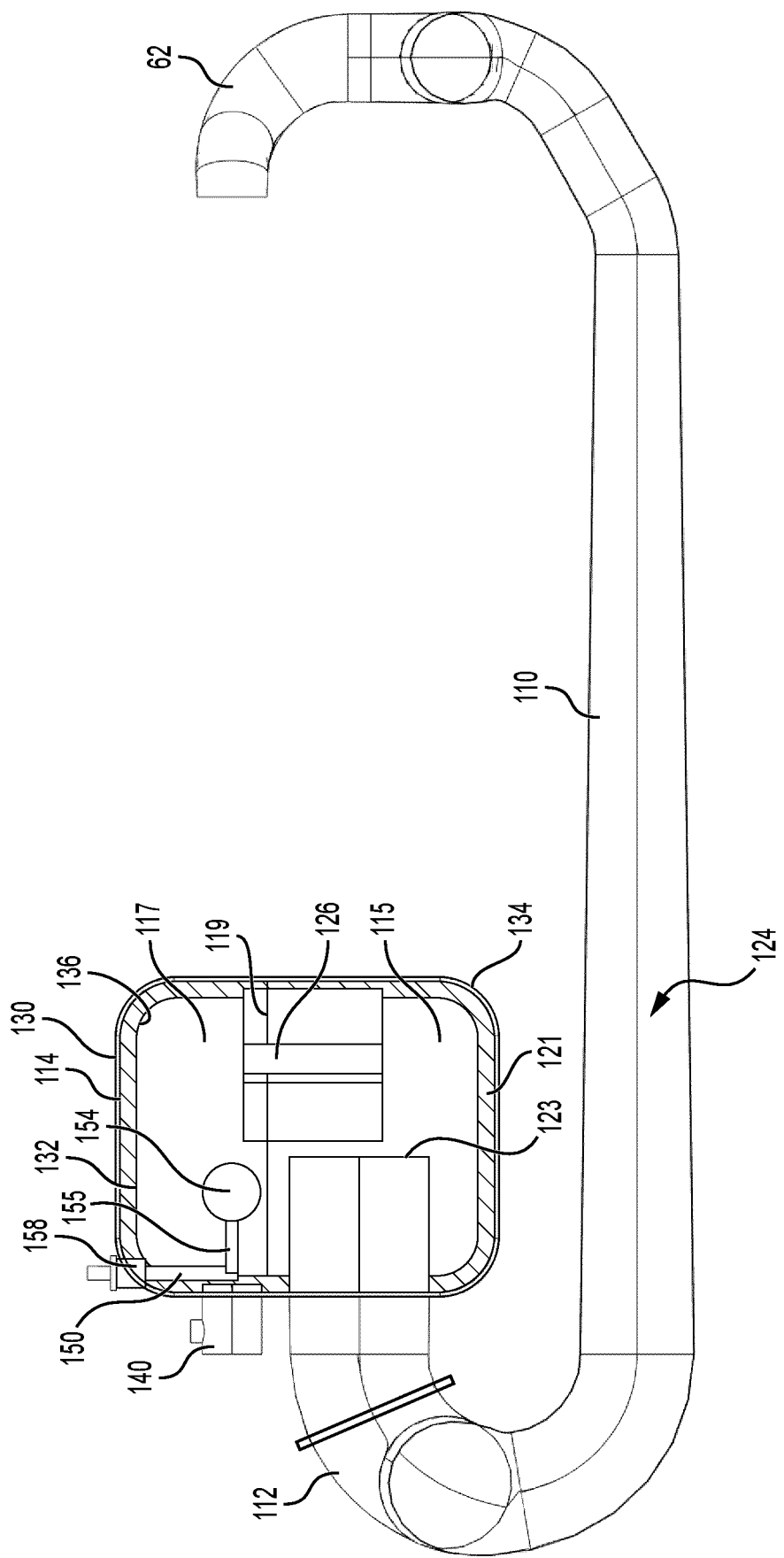
FIG. 15 is a cross-sectional view of the part of the exhaust system of FIG. 13 shown from a right side thereof, showing an exhaust path valve of the pre-muffler in a secondary exhaust path position.

As shown in FIG. 12, the pre-muffler 114 is disposed downstream from the catalytic converter 112 and upstream from the main muffler 120 and the hydrocarbon trap 122. The pre-muffler 114 is a sound-attenuating structure configured to reduce noise emitted by the exhaust system 60 and, as will be described below, defines in part the two exhaust paths EP1, EP2. As shown in FIG. 15, the pre-muffler 114 has a pre-muffler housing 130 having inner and outer surfaces 132, 134, and an acoustic dampening material 121 lining the inner surface 132 of the pre-muffler housing 130. In this embodiment, the acoustic dampening material 121 is fiber glass wool. It is contemplated that the acoustic dampening material 121 could be any other suitable material (e.g., steel wool). As partially shown in FIG. 15, a metallic mesh 136 is disposed inside the pre-muffler housing 130 inwardly of the acoustic dampening material 121. As such, the acoustic dampening material 121 is disposed between the inner surface 132 of the pre-muffler housing 130 and the metallic mesh 136. The metallic mesh 136 retains the acoustic dampening material 121 in place and may also help improve acoustics. The metallic mesh 136 could comprise steel or other suitable metallic materials.

Figure 16:
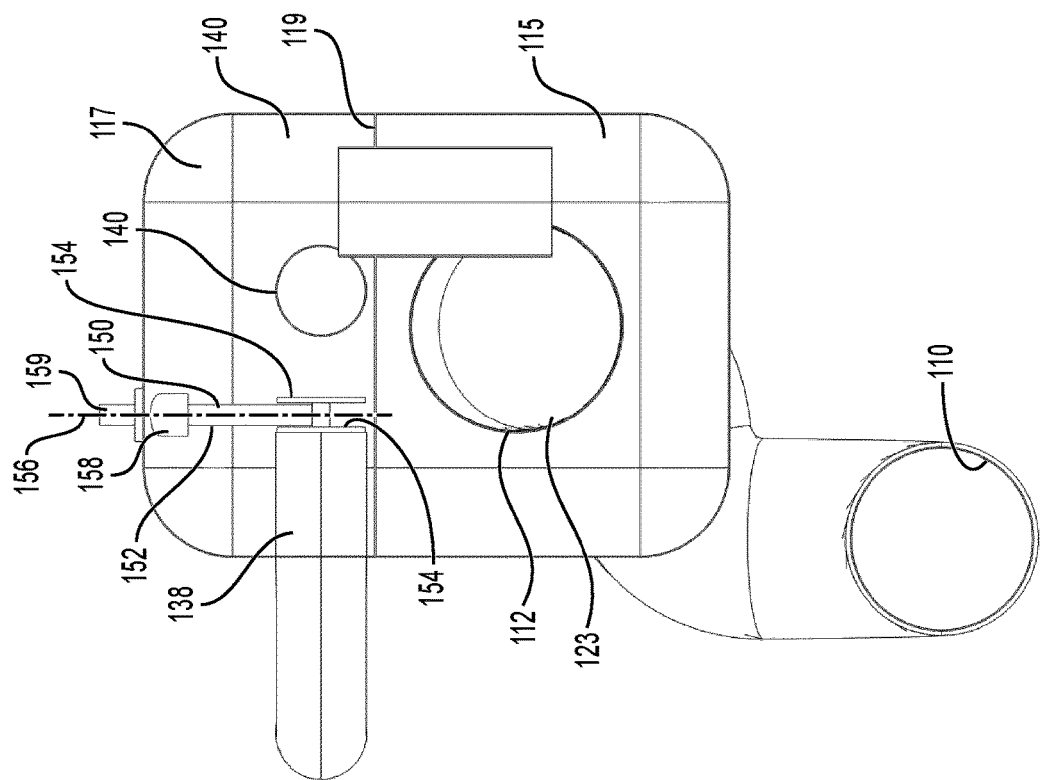
FIG. 16 is a cross-sectional view of the part of the exhaust system of FIG. 13 taken along line A-A in FIG. 14, showing the exhaust path valve in the secondary exhaust path position.
Figure 17:
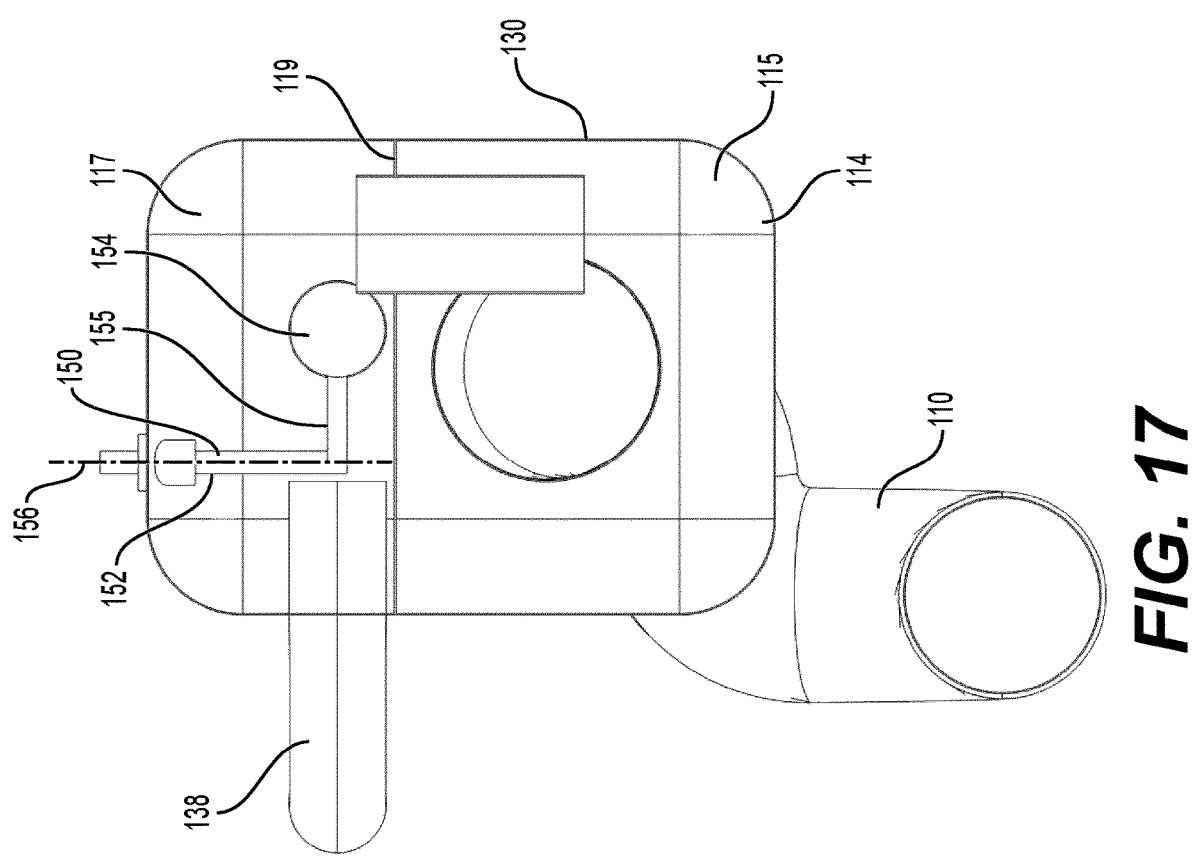
FIG. 17 is a cross-sectional view of the part of the exhaust system of FIG. 13 taken along line A-A in FIG. 14, showing the exhaust path valve in a main exhaust path position.
Figure 18:
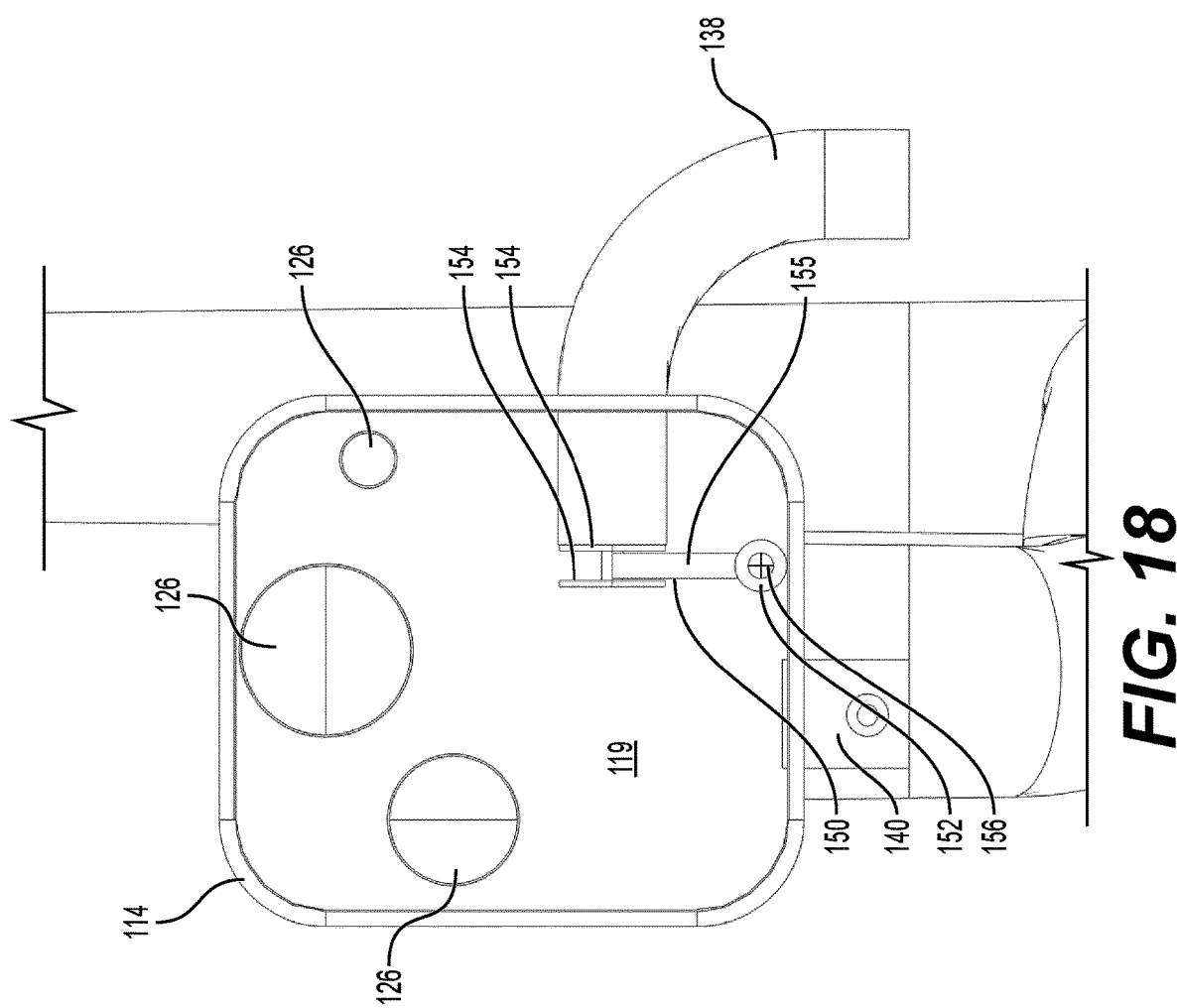
FIG. 18 is a cross-sectional view of the part of the exhaust system of FIG. 13 taken along line B-B in FIG. 14, showing the exhaust path valve in the secondary exhaust path position.
Figure 19:
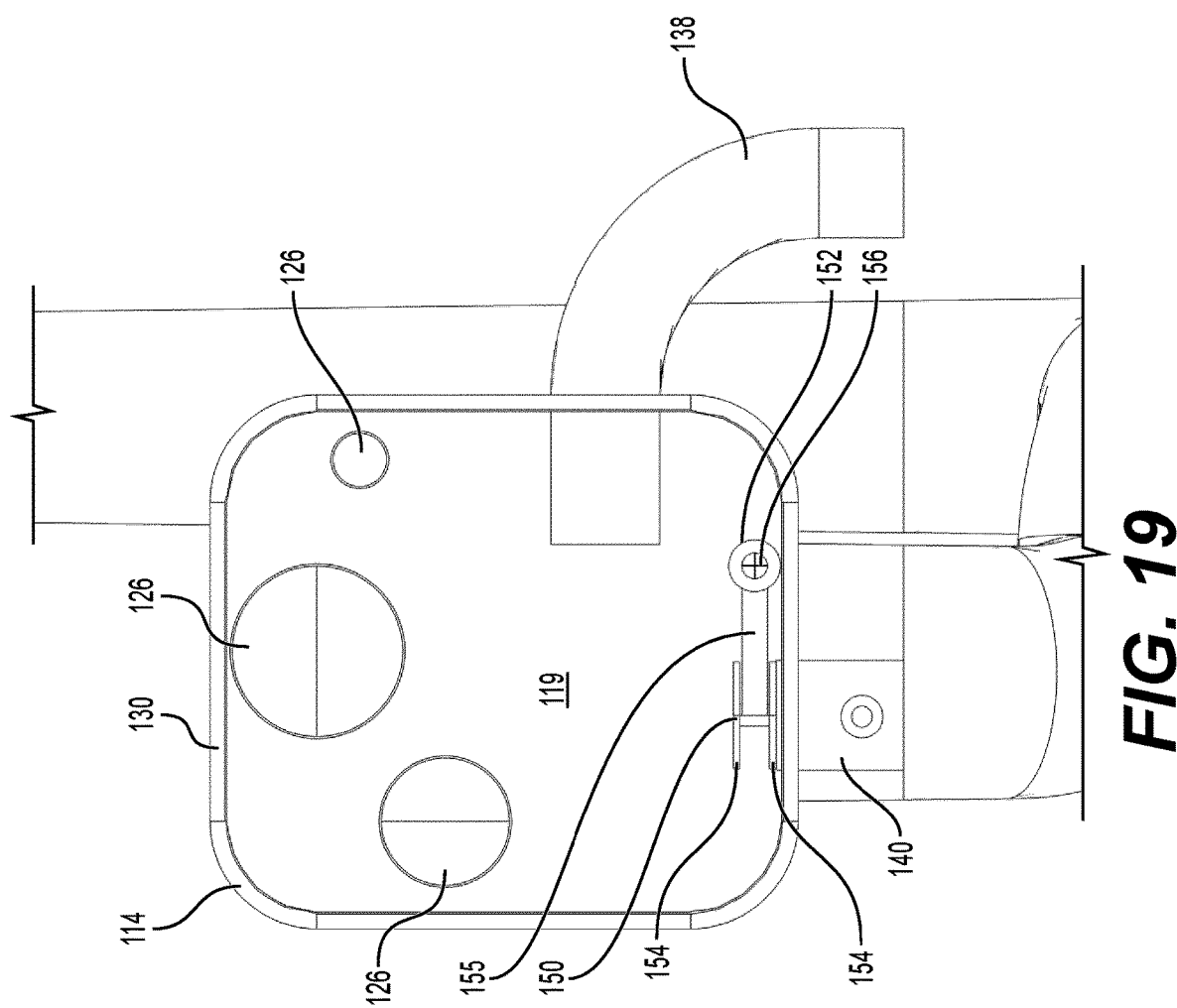
FIG. 19 is a cross-sectional view of the part of the exhaust system of FIG. 13 taken along line B-B in FIG. 14, showing the exhaust path valve in the main exhaust path position.

As shown in FIGS. 15 to 17, in this embodiment, the pre-muffler 114 defines two pre-muffler chambers 115, 117, including an inlet pre-muffler chamber 115 and an outlet pre-muffler chamber 117, divided by a partition wall 119. The inclusion of the two pre-muffler chambers 115, 117 may be helpful to further attenuate noise emission. In this embodiment, the partition wall 119 is formed at least in part by the metallic mesh 136 such that the metallic mesh 136 separates the two pre-muffler chambers 115, 117. The two pre-muffler chambers 115, 117 are in fluid communication with one another via three passages 126 (see FIGS. 15, 18) extending through the partition wall 119. In this embodiment, the catalytic converter 112 extends partly into the inlet pre-muffler chamber 115 and is in fluid communication therewith. Notably, as shown in FIG. 15, an outlet 123 of the catalytic converter 112 opens into the inlet pre-muffler chamber 115. As such, exhaust gas flows from the catalytic converter 112 to the inlet pre-muffler chamber 115 before flowing through the passages 126, into the outlet pre-muffler chamber 117, and through one of the exhaust paths EP1, EP2 as will be described below.

It is contemplated that, in other embodiments, the partition wall 119 could be omitted such that the pre-muffler 114 defines a single chamber.

As shown in FIG. 13, a muffler conduit 138 and a trap conduit 140 extend from the pre-muffler 114 to fluidly connect the pre-muffler 114 to the main muffler 120 and the hydrocarbon trap 122 respectively. In particular, each of the muffler conduit 138 and the trap conduit 140 opens into the outlet pre-muffler chamber 117 to route exhaust gas from the outlet pre-muffler chamber 117 to the main muffler 120 and the hydrocarbon trap 122 respectively. Notably, the muffler conduit 138 defines in part the exhaust path EP1, which can be referred to as the "main exhaust path" EP1, while the trap conduit 140 defines in part the exhaust path EP2, which can be referred to as a the "secondary exhaust path" EP2. As shown in FIG. 12, and as will be described in more detail below, exhaust selectively flows along a main flow F1 following the main exhaust path EP1 or along a secondary flow F2 following the secondary exhaust path EP2.

While muffler conduit 138 and the trap conduit 140 are illustrated as having generally the same diameter in this embodiment, it is contemplated that, in other embodiments, the diameter of the muffler conduit 138 may be greater than the diameter of the trap conduit 140. Notably, a larger diameter for the muffler conduit 138 may be useful to accommodate a greater mass flow of exhaust gas for when the engine 10 is operating under substantial load, whereas a smaller diameter can be sufficient for the trap conduit 140 as it is used when the engine 10 is under low load.

As shown in FIGS. 15 to 19, an exhaust path valve 150 is enclosed within the outlet pre-muffler chamber 117 of the pre-muffler 114 and is operable to selectively obstruct the main exhaust path EP1 and the secondary exhaust path EP2 to prevent exhaust gas from the catalytic converter 112 flowing through the main exhaust path EP1 and the secondary exhaust path EP2 respectively. More specifically, the exhaust path valve 150 is movable between a main exhaust path position (shown in FIGS. 17, 19) and a secondary exhaust path position (shown in FIGS. 15, 16 and 18). In the main exhaust path position, the exhaust path valve 150 obstructs the secondary exhaust path EP2 such that exhaust gas flows, sequentially, from the exhaust ports 34 of the cylinders 30 to the catalytic converter 112, to the pre-muffler 114, to the main muffler 120 and then to the atmosphere. In other words, exhaust gas is not permitted to enter the secondary exhaust path EP2 in the main exhaust path position of the exhaust path valve 150, instead following the path of the main flow F1 (FIG. 12). In contrast, in the secondary exhaust path position, the exhaust path valve 150 obstructs the main exhaust path EP1 such that exhaust gas flows, sequentially, from the exhaust ports 34 of the cylinders 30 to the catalytic converter 112, to the pre-muffler 114, to the hydrocarbon trap 122 and then to the atmosphere. In other words, exhaust gas is not permitted to enter the main exhaust path EP1 in the secondary exhaust path position of the exhaust path valve 150, instead following the path of the secondary flow F2 (FIG. 12).

With reference to FIGS. 15 to 19, the exhaust path valve 150 has a valve shaft 152 and two valve bodies 154 connected to the valve shaft 152 via an arm 155. In this embodiment, the arm 155 is substantially perpendicular to the valve shaft 152. The valve bodies 154 are disposed on opposite sides of the arm 155 and are configured to obstruct corresponding ones of the muffler conduit 138 and the trap conduit 140. In this embodiment, the valve bodies 154 are identical to one another since the inlet of the muffler conduit 138 is identical to the inlet of the trap conduit 140. Notably, in this embodiment, each valve body 154 is a plate member that is generally circular. However, it is contemplated that, in other embodiments, the valve bodies 154 could be configured differently from one another in cases where the inlet of the muffler conduit 138 is differently shaped and/or dimensioned from the inlet of the trap conduit 140.

In this embodiment, the exhaust path valve 150 is pivotable between its main exhaust path position and secondary exhaust path position about a valve axis 156 defined by the valve shaft 152. Notably, the valve axis 156 extends along the elongate direction of the valve shaft 152. In order to pivot the exhaust path valve 150 between the main and secondary exhaust path positions, as schematically shown in FIG. 13, an exhaust path valve actuator 160 is provided on the outside of the pre-muffler 114. The exhaust path valve actuator 160 is operatively connected to the exhaust path valve 150 via a pivot 158 that is pivotably connected to the pre-muffler housing 130. In particular, the exhaust path valve actuator 160 is connected to a pivot connector 159 extending from the pivot 158 while the valve shaft 152 is connected to the pivot 158 on an opposite side from the pivot connector 159. The exhaust path valve actuator 160 is thus configured to cause rotation of the pivot 158 about the valve axis 156 so as to move the exhaust path valve 150 between the main and secondary exhaust path positions. The exhaust path valve actuator 160 could be any suitable type of actuator, such as a step motor for example.

While a single exhaust path valve 150 is provided in this embodiment, it is contemplated that more exhaust path valves could be provided in other embodiments. For instance, in alternative embodiments, two exhaust path valves could be provided, each one being configured to obstruct a given one of the muffler conduit 138 and the trap conduit 140.

As shown in FIG. 11, in this embodiment, the exhaust path valve actuator 160 is in communication with and controlled by the ECU 72 so that the ECU 72 can control movement of the exhaust path valve 150 through the exhaust path valve actuator 160. It is contemplated that the exhaust path valve actuator 160 could be controlled by a separate controller in other embodiments.

The ECU 72 controls the exhaust path valve actuator 160 to move the exhaust path valve 150 to be in the main exhaust path position or the secondary exhaust path position based on one or more operational parameters of the engine assembly 100. In this embodiment, the ECU 72 controls the exhaust path valve actuator 160 to move the exhaust path valve 150 to be in the main exhaust path position or the secondary exhaust path position based at least on a temperature of a part of the engine assembly 100. For example, as shown in FIG. 11, the ECU 72 is in communication with a temperature sensor 162 configured to sense a temperature of the catalytic converter 112. The temperature sensor 162 thus transmits input data to the ECU 72 indicative of the temperature of the catalytic converter 112. The ECU 72 compares the sensed temperature of the catalytic converter 112 received from the temperature sensor 162 and compares it to a threshold temperature (e.g., stored in the memory module 220 of the ECU 72). In this example, the threshold temperature corresponds to the light-off temperature of the catalytic converter 112. Thus, in response to the sensed temperature of the catalytic converter 112 being equal to or greater than the threshold temperature, the ECU 72 controls the exhaust path valve actuator 160 to move the exhaust path valve 150 to be in the main exhaust path position and exhaust gas thus flows through the main exhaust path EP1 (i.e., through the main muffler 120). On the other hand, in response to the sensed temperature of the catalytic converter 112 being less than the threshold temperature, the ECU 72 controls the exhaust path valve actuator 160 to move the exhaust path valve 150 to be in the secondary exhaust path position (or maintain the exhaust path valve 150 in the secondary exhaust path position if it was already in that position) and exhaust gas thus flows through the secondary exhaust path EP2 (i.e., through the hydrocarbon trap 122).

Instead of directly using the temperature of the catalytic converter 112 as the operational parameter on the basis of which the exhaust path valve 150 is placed in the main exhaust path position or the secondary exhaust path position, in other embodiment, other temperatures could be used that are correlated to the temperature of the catalytic converter 112. For instance, in some embodiments, the operational parameter may be: the temperature of the exhaust gas discharged by the engine 10 which could be measured at a point upstream or downstream from the catalytic converter 112 (e.g., before the hydrocarbon trap 122), the temperature of an engine coolant of the engine 10, or the temperature of a hydrocarbon trapping material 182 in the hydrocarbon trap 122.

In other embodiments, the ECU 72 could control the exhaust path valve actuator 160 based on other operational parameters of the engine assembly 100. For instance, in some embodiments, the ECU 72 can control the exhaust path valve actuator 160 to move the exhaust path valve 150 to be in the main exhaust path position or the secondary exhaust path position based at least on an amount of time elapsed since starting of the engine 10. For instance, the ECU 72 compares the amount of time elapsed since the most recent starting of the engine 10 to a threshold time (e.g., stored in the memory module 220 of the ECU 72). The threshold time corresponds approximately to the average amount of time it takes for the catalytic converter 112 to reach its light-off temperature after starting of the engine 10. In response to the amount of time elapsed since starting of the engine 10 being equal to or greater than the threshold time, the ECU 72 controls the exhaust path valve actuator 160 to move the exhaust path valve 150 to be in the main exhaust path position and exhaust gas thus flows through the main exhaust path EP1 (i.e., through the main muffler 120). On the other hand, in response to the amount of time elapsed since starting of the engine 10 being less than the threshold time, the ECU 72 controls the exhaust path valve actuator 160 to move the exhaust path valve 150 to be in the secondary exhaust path position (or maintain the exhaust path valve 150 in the secondary exhaust path position if it was already in that position) and exhaust gas thus flows through the secondary exhaust path EP2 (i.e., through the hydrocarbon trap 122).

As another example, in some embodiments, the ECU 72 can control the exhaust path valve actuator 160 to move the exhaust path valve 150 to be in the main exhaust path position or the secondary exhaust path position based at least on a rate of fuel consumption of the engine 10. That is, the ECU 72 determines whether to position the exhaust path valve 150 in the main exhaust path position or the secondary exhaust path position based on the amount of fuel consumed by the engine 10 within a set period of time. Notably, as shown in FIG. 11, in this embodiment, the ECU 72 is in communication with a fuel sensor 170 that is configured to sense the amount of fuel routed to the fuel injectors 68. The fuel sensor 170 thus transmits input data to the ECU 72 indicative of the amount of fuel consumed by the engine 10 over a set period of time (e.g., over the last 10 minutes). The ECU 72 compares the sensed rate of fuel consumption of the engine 10 received from the fuel sensor 170 and compares it to a threshold rate of fuel consumption of the engine 10 (e.g., stored in the memory module 220 of the ECU 72). The threshold rate of fuel consumption of the engine 10 is a value of the rate of fuel consumption that indicates that the engine 10 has been recently running for a sufficient amount of time for the engine assembly 100 to reach a certain temperature. More specifically, the threshold rate of fuel consumption corresponds to a rate of fuel consumption that is associated with the catalytic converter 112 having reached its light-off temperature. Thus, in response to the sensed rate of fuel consumption of the engine being equal to or greater than the threshold rate of fuel consumption, the ECU 72 controls the exhaust path valve actuator 160 to move the exhaust path valve 150 to be in the main exhaust path position and exhaust gas thus flows through the main exhaust path EP1 (i.e., through the main muffler 120). On the other hand, in response to the sensed rate of fuel consumption of the engine 10 being less than the threshold rate of fuel consumption, the ECU 72 controls the exhaust path valve actuator 160 to move the exhaust path valve 150 to be in the secondary exhaust path position (or maintain the exhaust path valve 150 in the secondary exhaust path position if it was already in that position) and exhaust gas thus flows through the secondary exhaust path EP2 (i.e., through the hydrocarbon trap 122).

In yet other embodiments, the ECU 72 can control the exhaust path valve actuator 160 to move the exhaust path valve 150 to be in the main exhaust path position or the secondary exhaust path position based at least on an amount of oxygen contained in exhaust gas discharged by the engine 10. Notably, as shown in FIG. 11, in such embodiments, the ECU 72 is in communication with an oxygen sensor 165 (i.e., a lambda sensor) that is configured to sense the amount of oxygen within the exhaust gas discharged by the engine 10. The oxygen sensor 165 thus transmits input data to the ECU 72 indicative of the amount of oxygen contained in the exhaust gas. The oxygen sensor 165 may be disposed at the exhaust manifold 62. The ECU 72 compares the sensed amount of oxygen received from the oxygen sensor 165 and to a threshold amount of oxygen (e.g., stored in the memory module 220 of the ECU 72). The threshold amount of oxygen corresponds to an amount of oxygen that can be associated with the catalytic converter 112 having reached its light-off temperature. Thus, in response to the sensed amount of oxygen being equal to or greater than the threshold amount of oxygen, the ECU 72 controls the exhaust path valve actuator 160 to move the exhaust path valve 150 to be in the main exhaust path position and exhaust gas thus flows through the main exhaust path EP1 (i.e., through the main muffler 120). On the other hand, in response to the sensed amount of oxygen level being less than the threshold amount of oxygen, the ECU 72 controls the exhaust path valve actuator 160 to move the exhaust path valve 150 to be in the secondary exhaust path position (or maintain the exhaust path valve 150 in the secondary exhaust path position if it was already in that position) and exhaust gas thus flows through the secondary exhaust path EP2 (i.e., through the hydrocarbon trap 122).

In yet other embodiments, the ECU 72 can control the exhaust path valve actuator 160 to move the exhaust path valve 150 to be in the main exhaust path position or the secondary exhaust path position based at least on the position of the throttle valve 48. Notably, the throttle valve position sensor 76 transmits input data to the ECU 72 indicative of the position of the throttle valve 48 within the throttle body 52. The ECU 72 compares the sensed position of the throttle valve 48 to a threshold position of the throttle valve 48 (e.g., stored in the memory module 220 of the ECU 72). The threshold position of the throttle valve 48 corresponds to a position of the throttle valve 48 that can be associated with the catalytic converter 112 having reached its light-off temperature (e.g., when the engine 10 is operating under high load). Thus, in response to the position of the throttle valve 48 being equal to or greater than the threshold position of the throttle valve 48, the ECU 72 controls the exhaust path valve actuator 160 to move the exhaust path valve 150 to be in the main exhaust path position and exhaust gas thus flows through the main exhaust path EP1 (i.e., through the main muffler 120). On the other hand, in response to the sensed position of the throttle valve 48 being less than the threshold position of the throttle valve 48, the ECU 72 controls the exhaust path valve actuator 160 to move the exhaust path valve 150 to be in the secondary exhaust path position (or maintain the exhaust path valve 150 in the secondary exhaust path position if it was already in that position) and exhaust gas thus flows through the secondary exhaust path EP2 (i.e., through the hydrocarbon trap 122).

In some embodiments, the ECU 72 could control the exhaust path valve actuator 160 to move the exhaust path valve 150 to be in the main exhaust path position or the secondary exhaust path position based on a combination of the above-described operational parameters of the engine assembly 100.

Figure 20:
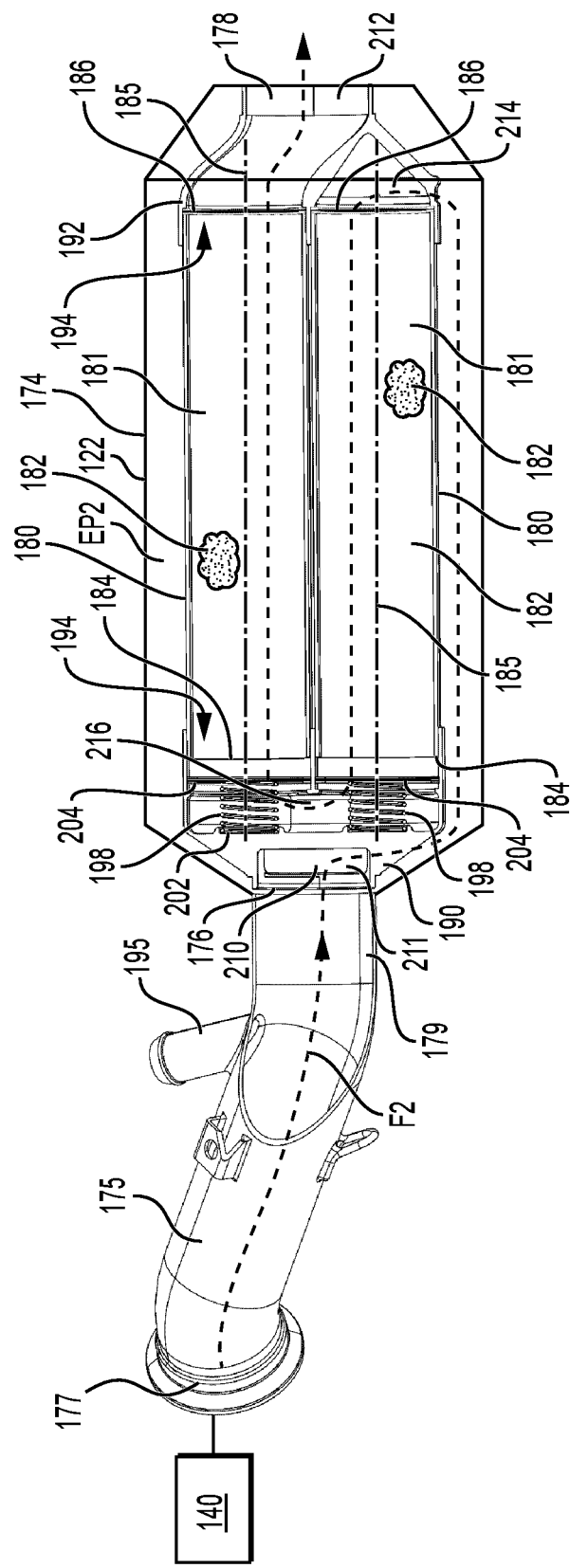
FIG. 20 is a cross-sectional view of a hydrocarbon trap of the exhaust system of FIG. 12.

With reference now to FIG. 20, a connecting conduit 175 is fluidly connected between the trap conduit 140 of the pre-muffler 114 and the hydrocarbon trap 122. Notably, the connecting conduit 175 is connected at a first end 177 to the outlet of the trap conduit 140 and at a second end 179 to an exhaust inlet 176 of the hydrocarbon trap 122. A purging conduit 195 opens into the connecting conduit 175 between the opposite ends 177, 179 thereof (i.e., the purging conduit 195 extends from the connecting conduit 175). In other words, the purging conduit 195 is fluidly connected to the secondary exhaust path EP2 downstream from the pre-muffler 114 and upstream from the hydrocarbon trap 122. This location of the purging conduit 195 may allow to easily conceal its presence in the vehicle, which helps keep the configurations of the main and secondary exhaust paths EP1, EP2 generally symmetrical to one another, thereby facilitating the design of the vehicle and improving aesthetics. The purging conduit 195 is also fluidly connected to the air intake system 50. The function of the purging conduit 195 will be described in greater detail below.

The hydrocarbon trap 122 will now be described with continued reference to FIG. 20. The hydrocarbon trap 122 has a trap housing 174 defining the exhaust inlet 176 and an exhaust outlet 178 for receiving and discharging exhaust gas respectively. The trap housing 174 is sized and shaped to have a similar appearance to the main muffler 120, as is illustrated in FIG. 12, in order to facilitate the design of the vehicle and improve its aesthetics. In this embodiment, the hydrocarbon trap 122 includes two sleeves 180 enclosed within the trap housing 174. The two sleeves 180 are identical to one another and therefore a single one of the sleeves 180 will be described in detail herein. It is to be understood that the same description applies to both sleeves 180.

Figure 21:
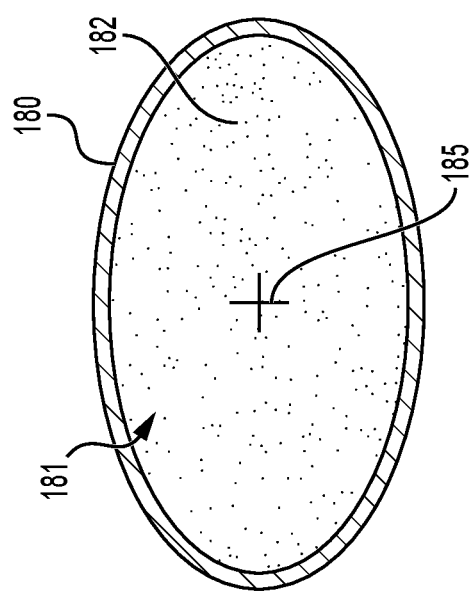
FIG. 21 is a cross-sectional view of a sleeve and a hydrocarbon trapping material of the hydrocarbon trap of FIG. 20.

As best shown in FIG. 21, the sleeve 180 has a generally elliptical cross-section and defines a central passage 181 for flow of exhaust gas therethrough as exhaust gas flows from the exhaust inlet 176 to the exhaust outlet 178 of the hydrocarbon trap 122. The sleeve 180 may be shaped differently in other embodiments (e.g., cylindrical). The sleeve 180 has front and rear ends 184, 186 opposite one another and defines a center axis 185 extending through the front and rear ends 184, 186. The center axis 185 defines a center of the central passage 181. As shown in FIGS. 20 and 21, the sleeve 180 houses a hydrocarbon trapping material 182 that is suitable for adsorbing hydrocarbon from exhaust gas flowing through the sleeve 180 (only a part of the hydrocarbon trapping material 182 contained in the sleeve 180 is illustrated in FIG. 20 for clarity). In particular, the hydrocarbon trapping material 182 is pelletized or granulated activated carbon and fills the sleeve 180. As such, when exhaust gas flows through the sleeve 180 and thereby through the pellets or granules of hydrocarbon carbon trapping material 182, the hydrocarbon trapping material 182 adsorbs hydrocarbon therefrom and retains noxious emissions that would otherwise be contained in the exhaust gas being discharged from the hydrocarbon trap 122.

In this embodiment, the two sleeves 180 are arranged such that their center axes 185 are parallel to one another. More specifically, the front ends 184 of the two sleeves 180 are adjacent to one another and the rear ends 186 of the two sleeves 180 are adjacent to one another. The parallel arrangement of the sleeves 180 provides a substantial amount of hydrocarbon trapping material 182 in the hydrocarbon trap 122 without making the hydrocarbon trap 122 excessively cumbersome which can be difficult to accommodate in a vehicle that could have limited space.

With continued reference to FIG. 20, the hydrocarbon trap 122 has two sleeve support members 190, 192 disposed at the inlet end and the outlet end of the hydrocarbon trap 122 respectively. The sleeve support members 190, 192 may thus also be referred to as an "inlet end sleeve support member" 190 and an "outlet end sleeve support member" 192. The sleeve support members 190, 192 support the sleeves 180, namely receiving the ends 184, 186 of the sleeves 180 in corresponding recesses 194 defined by each of the sleeve support members 190, 192. As such, each sleeve 180 is disposed between the sleeve support members 190, 192.

Figure 22:
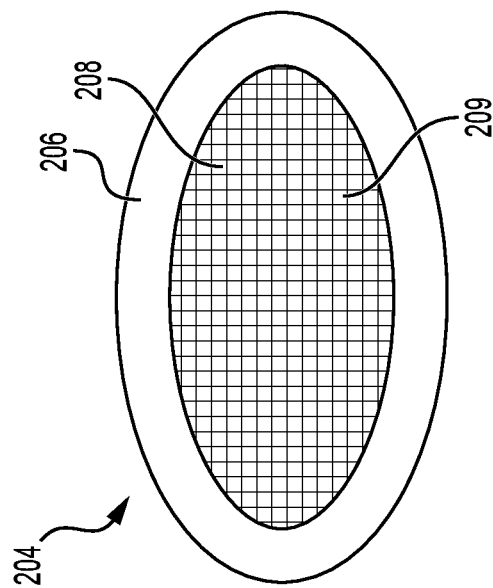
FIG. 22 is a front elevation view of a compression member of the hydrocarbon trap of FIG. 20.

The hydrocarbon trapping material 182 is compressed between the two sleeve support members 190, 192. More specifically, the hydrocarbon trap 122 includes two biasing elements 198 for compressing the hydrocarbon trapping material 182 between the sleeve support members 190, 192. In this embodiment, the biasing elements 198 are compression springs that are received in corresponding spring seats 202 defined by the inlet end sleeve support member 190. The biasing elements 198 are thus connected to the inlet end sleeve support member 190. Each biasing element 198 is compressed between the corresponding spring seat 202 and a compression member 204 that is received in the corresponding recess 194. As shown in FIG. 22, the compression member 204 includes a peripheral portion 206 and a central portion 208 disposed centrally of the peripheral portion 206.

The central portion 208 is perforated, defining a plurality of openings 209 to allow flow therethrough. The biasing elements 198 thus push against the compression members 204 which compress the hydrocarbon trapping material 182 of the sleeves 180 against the outlet end sleeve support member 192 such that the hydrocarbon trapping material 182 is compressed between the ends 184, 186 of the sleeves 180. The compression of the hydrocarbon trapping material 182 ensures that the hydrocarbon trapping material 182 fills the sleeve 180 substantially homogeneously to prevent voids of hydrocarbon trapping material 182 within the sleeve 180. This may ensure efficient hydrocarbon adsorption as exhaust gas flows through the passages 181 defined by the sleeves 180. Moreover, it can also be helpful to reduce rattling noise that could be caused by motion of the hydrocarbon trapping material 182 if it were not compressed.

With reference to FIG. 20, the flow of exhaust gas through the hydrocarbon trap 122 will now be described with reference to a secondary flow F2 along the second exhaust path EP2. The sleeve support members 190, 192 define respective inlet and outlet openings 210, 212 through which exhaust gas enters and is discharged respectively. Notably, when exhaust gas flows along the secondary flow F2 to be discharged via the secondary exhaust path EP2, the exhaust gas enters the hydrocarbon trap 122 through the inlet 176 and enters the inlet opening 210 of the inlet end sleeve support member 190. The exhaust gas then flows out of the inlet end sleeve support member 190 through a recess 211 to flow between the outer sides of the sleeves 180 and the inner surface of the trap housing 174 (i.e., within the trap housing 174, outside of the sleeves 180).

The exhaust gas then flows to the opposite end of the hydrocarbon trap 122, toward the exhaust outlet 178 of the hydrocarbon trap 122, where it flows through opening 214 defined by the outlet end sleeve support member 192 and into the passage 181 of a first sleeve 180 via the rear end 186 thereof. The rear end 186 of the first sleeve 180 can thus be referred to as a "first sleeve inlet end". The exhaust gas then flows to the front end 184 of the first sleeve 180 (which may thus be referred to as a "first sleeve outlet end"), toward the exhaust inlet 176 of the hydrocarbon trap 122, and through the corresponding compression member 204 into passage 216 in the inlet end sleeve support member 190. The exhaust gas then flows through the compression member 204 corresponding to a second sleeve 180 and into the passage 181 of that second sleeve 180 via the front end 184 thereof, toward the exhaust outlet 178. The front end 184 of the second sleeve 180 may thus be referred to as a "second sleeve inlet end". As can be seen, the passages 181 of the sleeves 181 are thus fluidly connected in series so that the exhaust gas flows through both passages 181 subsequently. The exhaust gas then exits the second sleeve 180 via its rear end 186 (which may thus be referred to as a "second sleeve outlet end") and is discharged from the outlet 212 defined by the outlet end sleeve support member 192. Lastly, exhaust gas flows out of the hydrocarbon trap 122 via the exhaust outlet 178 of the hydrocarbon trap 122 and out in the atmosphere.

Thus, when exhaust gas is routed through the secondary exhaust path EP2 instead of the main exhaust path EP1, at least part of the hydrocarbon contained within the exhaust gas remains trapped within the hydrocarbon trap 122. However, once the operational parameter monitored by the ECU 72 on the basis of which the exhaust path valve 150 is controlled reaches a value that is indicative of the catalytic converter 112 reaching its light-off temperature, the exhaust path valve 150 is moved to its main exhaust path position so that exhaust gas flows through the main exhaust path EP1 (i.e., through the main muffler 120).

Figure 23:
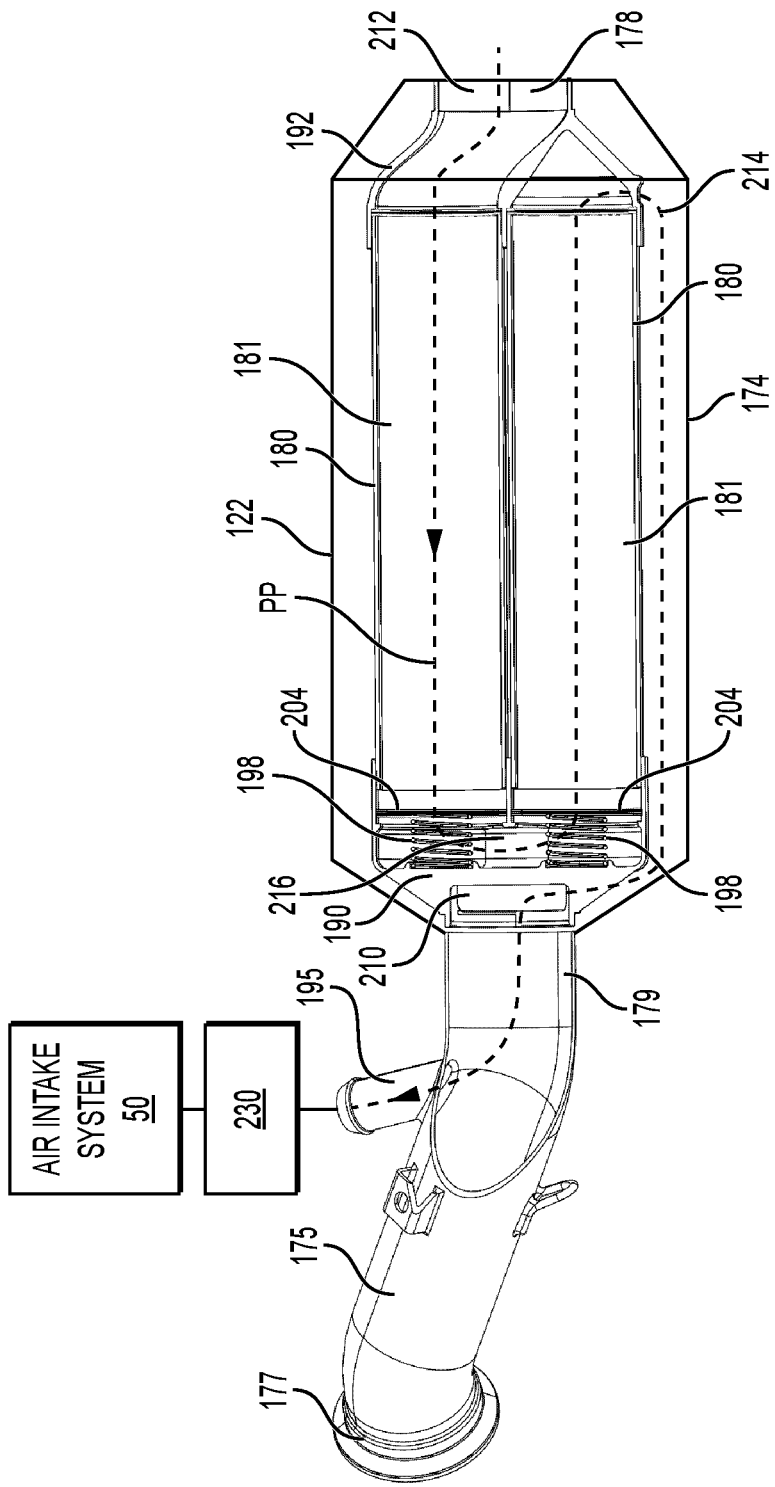
FIG. 23 is a cross-sectional view of the hydrocarbon trap of FIG. 20, showing air flow through the hydrocarbon trap during purging thereof.

At this stage, the hydrocarbon captured by the hydrocarbon trap 122 can be purged therefrom. As shown schematically in FIG. 6, the purging conduit 195 is fluidly connected to the compressor 54 by the recirculation manifold 90 to purge the hydrocarbon captured in the hydrocarbon trap 122 thereto. In particular, the purging conduit 195 is connected to the purge connector 108 of the recirculation manifold 90. With reference to FIG. 23, a purge valve 230 is disposed within the purging conduit 195 and is operable to selectively fluidly communicate the air intake system 50 with the second exhaust path EP2 via the purging conduit 195 so as to purge the hydrocarbon from the hydrocarbon trap 122 to the air intake system 50. In particular, the purge valve 230 is movable between an exhaust position and a purging position. In the exhaust position of the purge valve 230, the exhaust path valve 150 is in the secondary exhaust path position in order for exhaust gas to flow out of the exhaust system 60 through the secondary exhaust path EP2, while the purge valve 230 blocks flow through the purging conduit 195. As such, when the purge valve 230 is in its exhaust position, the secondary exhaust path EP2 is not in fluid communication with the air intake system 50. On the other hand, in the purging position of the purge valve 230, the exhaust path valve 150 is in the main exhaust path position in order for exhaust gas to flow out of the exhaust system through the main exhaust path EP1, and the purge valve 230 allows flow through the purging conduit 195. By allowing flow through the purging conduit 195 in the purging position of the purge valve 230, ambient air is drawn into the second exhaust path EP2 via the exhaust outlet 178 and flows to the air intake system 50 via the purging conduit 195 thereby providing the air intake system 50 with hydrocarbon purged from the hydrocarbon trap 122. In particular, the pressure generated by the compressor 54 of the air intake system 50 causes the ambient air to be drawn into the second exhaust path EP2 via the outlet 178 of the hydrocarbon trap 122. For instance, in this embodiment, the suction pressure generated by the compressor 54 could be as much as 300 mbar (depending on the degree to which the purge valve 230 is open).

Thus, when the purging conduit 195 is open (i.e., purge valve 230 in the purging position), the compressor 54 draws air from the purging conduit 195 through the purge connector 108. The air then travels up the recirculation manifold 90 and into the compressor 54 where it is pumped into the engine 10.

In this embodiment, with reference to FIG. 11, the purge valve 230 is actuated between its exhaust and purging positions by a purge valve actuator 235. The purge valve actuator 235 is in communication with the ECU 72. As such, the ECU 72 controls the purge valve actuator 235 to selectively move the purge valve 230 between the exhaust and purging positions. Furthermore, in this embodiment, the purge valve 230 is positioned near the intersection between the purging conduit 195 and the conduit 175 (i.e., near the second exhaust path EP2) such that the purge valve 230 is positioned closer, along the purging conduit 195, to the hydrocarbon trap 122 than to the air intake system 50. In this embodiment, the purge valve is a solenoid on/off valve. Other types of valves are contemplated.

It is contemplated that, in some embodiments, the purge valve 230 could be omitted. In such embodiments, there would be a continuous flow of exhaust gas or fresh air being recirculated to the air intake system 50 through the purging conduit 195. The hydrocarbon trap 122 would still be purged when the exhaust path valve 150 is in its main exhaust position (i.e., obstructing the secondary exhaust path EP2) as the pressure generated by the compressor 54 causes suction of ambient air through the hydrocarbon trap 122 and through the purging conduit 195 as described above. As the connecting conduit 175 is considerably larger in diameter than the purging conduit 195, the mass flow of exhaust gas flowing through the hydrocarbon trap 122 when the exhaust path valve 150 is in its secondary exhaust path position (i.e., obstructing the main exhaust path EP1) is significantly greater than the mass flow of air being aspirated into the purging conduit 195 when the exhaust path valve 150 is in the main exhaust path position.

Figure 24:
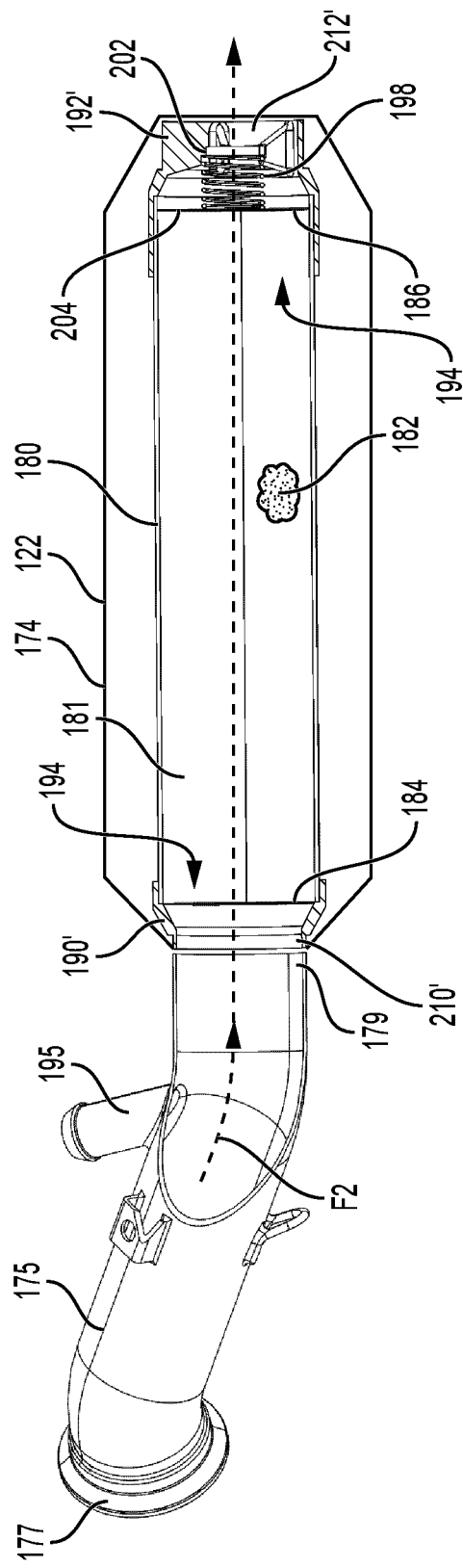
FIG. 24 is a cross-sectional view of a hydrocarbon trap according to an alternative embodiment.

As shown in FIG. 24, the hydrocarbon trap 122 can be configured differently in other embodiments. For instance, as can be seen, in an alternative embodiment, the hydrocarbon trap 122 includes a single sleeve 180. The components of the hydrocarbon trap 122 according to this alternative embodiment that are identical to those described above have been identified with the same reference numerals. Inlet end and outlet end sleeve support members 190', 192' are configured to support the single sleeve 180. To that end, each of the inlet end and outlet end sleeve support members 190', 192' defines a single recess 194 to support a respective end 184, 186 of the single sleeve 180. Moreover, the inlet opening 210' defined by the inlet end sleeve support member 190' extends through the inlet end sleeve support member 190', and opens into the recess 194 that receives the front end 184 of the sleeve 180. Similarly, the outlet end sleeve support member 192' defines an outlet opening 212' that extends through the outlet end sleeve support member 192', opening into the recess 194 that receives the rear end 186 of the sleeve 180. In this embodiment, a single biasing element 198 is provided since there is a single sleeve 180. The biasing element 198 is received in the spring seat 202 which is defined by the outlet end sleeve support member 192'. As can be seen, the secondary flow F2 through the secondary exhaust path EP2 defined in part by the hydrocarbon trap 122 of this alternative embodiment may be more direct, notably as exhaust gas flows through the passage 181 of the single sleeve 180 directly from the inlet end sleeve support member 190' and is discharged from the passage 181 and from the hydrocarbon trap 122 directly. The path of the secondary flow F2 through the hydrocarbon trap 122 is thus more linear. It is contemplated that, in order to compensate for the absence of a second sleeve 180, the hydrocarbon trap 122 according to this embodiment may be made longer so that more hydrocarbon trapping material 182 can be housed by the sleeve 180 to adequately adsorb hydrocarbons from the exhaust gas. Furthermore, the single sleeve 180 has a larger diameter, compared to the two sleeves 180 in FIG. 20, to accommodate more hydrocarbon trapping material 182.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:
1. An engine assembly for a vehicle, comprising:
an internal combustion engine comprising:
a crankcase;
a crankshaft disposed at least in part in the crankcase; and
a cylinder block connected to the crankcase, the cylinder block defining at least one cylinder, each of the at least one cylinder defining an exhaust port for discharging exhaust gas therefrom; and an exhaust system for discharging exhaust gas from the engine, the exhaust system defining a first exhaust path and a second exhaust path separate from one another, the exhaust system comprising:
  a catalytic converter in fluid communication with the exhaust port of the at least one cylinder to receive exhaust gas therefrom;
  a main muffler downstream from and in selective fluid communication with the catalytic converter, the main muffler defining at least in part the first exhaust path;
  a hydrocarbon trap downstream from and in selective fluid communication with the catalytic converter, the hydrocarbon trap defining at least in part the second exhaust path, the hydrocarbon trap comprising a hydrocarbon trapping material to adsorb hydrocarbon from exhaust gas flowing therethrough;
  a pre-muffler disposed upstream from the main muffler and the hydrocarbon trap, the pre-muffler defining a pre-muffler chamber, the catalytic converter being in fluid communication with the pre-muffler chamber such that exhaust gas flows from the catalytic converter to the pre-muffler chamber before flowing through one of the first exhaust path and the second exhaust path,
  the pre-muffler further comprising:
    a muffler conduit to fluidly connect the pre-muffler to the main muffler, and
    a trap conduit to fluidly connect the pre-muffler to the hydrocarbon trap; and
  at least one exhaust path valve operable to selectively obstruct the first exhaust path and the second exhaust path to prevent exhaust gas from the catalytic converter flowing through the first exhaust path and the second exhaust path respectively, the pre-muffler enclosing the at least one exhaust path valve, each of the at least one exhaust path valve being movable between a first exhaust path position and a second exhaust path position,
    the at least one exhaust path valve obstructing the second exhaust path in the first exhaust path position such that exhaust gas flows from the exhaust port of the at least one cylinder to the catalytic converter to the main muffler and to the atmosphere,
    the at least one exhaust path valve obstructing the first exhaust path in the second exhaust path position such that exhaust gas flows from the exhaust port of the at least one cylinder to the catalytic converter to the hydrocarbon trap and to the atmosphere,
  in the first exhaust path position, the at least one exhaust path valve blocking an inlet of the trap conduit,
  in the second exhaust path position, the at least one exhaust path valve blocking an inlet of the muffler conduit.

2. The engine assembly of claim 1, wherein:
the pre-muffler chamber is a first pre-muffler chamber;
the pre-muffler defining a second pre-muffler chamber in fluid communication with the first pre-muffler chamber;
an outlet of the catalytic converter opens into the first pre-muffler chamber; and the at least one exhaust path valve is disposed in the second pre-muffler chamber.

3. The engine assembly of claim 1, wherein the at least one exhaust path valve is a single exhaust path valve comprising:
  a valve shaft pivotable about a valve shaft axis;
  a first plate member connected to the valve shaft, the first plate member blocking the inlet of the trap conduit in the first exhaust path position of the exhaust path valve; and
  a second plate member connected to the valve shaft opposite the first plate member, the second plate member blocking the inlet of the muffler conduit in the second exhaust path position of the exhaust path valve.

4. The engine assembly of claim 1, wherein:
the exhaust system further comprises a valve actuator operatively connected to the at least one exhaust path valve to move the at least one exhaust path valve between the first exhaust path position and the second exhaust path position;
the engine assembly further comprises a controller in communication with the valve actuator to control movement of the at least one exhaust path valve therethrough; and
the controller is operable to control the valve actuator to move the at least one exhaust path valve to be in the first exhaust path position or the second exhaust path position based at least partly on at least one of:
  a rate of fuel consumption of the engine;
  a temperature of a part of the engine assembly;
  an amount of time elapsed since starting of the engine;
  an amount of oxygen contained in exhaust gas discharged by the engine; and
  a position of a throttle valve of an air intake system of the engine assembly.

5. The engine assembly of claim 4, wherein:
the controller is operable to control the valve actuator to move the at least one exhaust path valve to be in the first exhaust path position or the second exhaust path position based at least partly on the temperature of the part of the engine assembly; and
the part of the engine assembly is the catalytic converter.

6. The engine assembly of claim 1, wherein the exhaust system further comprises an exhaust pipe fluidly connected between the catalytic converter and the exhaust port of the engine, the exhaust pipe comprising an expanding section, a diameter of the exhaust pipe increasing along the expanding section as the exhaust pipe extends away from the exhaust port of the at least one cylinder.

7. The engine assembly of claim 1, wherein:
the at least one cylinder defines an intake port;
the crankcase is not in fluid communication with the intake port of the at least one cylinder; and the engine operates on a two-stroke engine cycle.

8. A vehicle comprising the engine assembly of claim 1.

9. An engine assembly for a vehicle, comprising:
an internal combustion engine comprising:
  a crankcase;
  a crankshaft disposed at least in part in the crankcase; and
  a cylinder block connected to the crankcase,
  the cylinder block defining at least one cylinder, each of the at least one cylinder defining an exhaust port for discharging exhaust gas therefrom; and
an exhaust system for discharging exhaust gas from the engine, the exhaust system defining a first exhaust path and a second exhaust path separate from one another, the exhaust system comprising:
  a catalytic converter in fluid communication with the exhaust port of the at least one cylinder to receive exhaust gas therefrom;
  a main muffler downstream from and in selective fluid communication with the catalytic converter, the main muffler defining at least in part the first exhaust path;
  a hydrocarbon trap downstream from and in selective fluid communication with the catalytic converter, the hydrocarbon trap defining at least in part the second exhaust path, the hydrocarbon trap comprising a hydrocarbon trapping material to adsorb hydrocarbon from exhaust gas flowing therethrough;
  a pre-muffler disposed upstream from the main muffler and the hydrocarbon trap, the pre-muffler defining a pre-muffler chamber, the catalytic converter being in fluid communication with the pre-muffler chamber such that exhaust gas flows from the catalytic converter to the pre-muffler chamber before flowing through one of the first exhaust path and the second exhaust path; and
  at least one exhaust path valve operable to selectively obstruct the first exhaust path and the second exhaust path to prevent exhaust gas from the catalytic converter flowing through the first exhaust path and the second exhaust path respectively, the pre-muffler enclosing the at least one exhaust path valve, each of the at least one exhaust path valve being movable between a first exhaust path position and a second exhaust path position,
    the at least one exhaust path valve obstructing the second exhaust path in the first exhaust path position such that exhaust gas flows from the exhaust port of the at least
  one cylinder to the catalytic converter to the main muffler and to the atmosphere, the at least one exhaust path valve obstructing the first exhaust path in the second exhaust path position such that exhaust gas flows from the exhaust port of the at least one cylinder to the catalytic converter to the hydrocarbon trap and to the atmosphere,
  the hydrocarbon trap having an exhaust inlet and an exhaust outlet for receiving and discharging exhaust gas respectively, the hydrocarbon trap comprising:
    a trap housing defining the exhaust inlet and the exhaust outlet of the hydrocarbon trap; and
    a sleeve enclosed at least in part by the trap housing, the sleeve housing the hydrocarbon trapping material, the sleeve defining a passage for flow of exhaust gas therethrough as exhaust gas flows from the exhaust inlet to the exhaust outlet of the hydrocarbon trap.

10. The engine assembly of claim 9, wherein the sleeve has a first end and a second end opposite one another, the hydrocarbon trap further comprising:
  a sleeve support member disposed at the first end of the sleeve, the sleeve support member comprising at least one opening for allowing flow therethrough; and
  a biasing element connected to the sleeve support member, the biasing element compressing the hydrocarbon trapping material between the first end and the second end of the sleeve.

11. The engine assembly of claim 9, wherein:
  the sleeve is a first sleeve, the passage being a first passage;
  the hydrocarbon carbon trapping material of the hydrocarbon trap comprises a first portion and a second portion;
  the first sleeve houses the first portion of the hydrocarbon trapping material;
  the hydrocarbon trap further comprises a second sleeve enclosed at least in part by the trap housing, the second sleeve housing the second portion of the hydrocarbon trapping material, the second sleeve defining a second passage for flow of exhaust gas therethrough as exhaust gas flows from the exhaust inlet to the exhaust outlet of the hydrocarbon trap; and
  the first passage and the second passage are fluidly connected in series such that, when the at least one exhaust path valve is in the second exhaust path position, exhaust gas flows through the first sleeve and the second sleeve subsequently.

12. The engine assembly of claim 11, wherein, in use, when the at least one exhaust path valve is in the second exhaust path position, exhaust gas subsequently flows:
  into the exhaust inlet of the hydrocarbon trap;
  within the trap housing outside of the first and second sleeves toward the exhaust outlet of the hydrocarbon trap;
  into the first passage of the first sleeve toward the exhaust inlet of the hydrocarbon trap;
  into the second passage of the second sleeve toward the exhaust outlet of the hydrocarbon trap; and
  out of the exhaust outlet of the hydrocarbon trap into the atmosphere.

13. An engine assembly for a vehicle, comprising:
  an internal combustion engine comprising:
    a crankcase;
    a crankshaft disposed at least in part in the crankcase; and
    a cylinder block connected to the crankcase,
    the cylinder block defining at least one cylinder, each of the at least one cylinder defining an exhaust port for discharging exhaust gas therefrom;
  and
  an exhaust system for discharging exhaust gas from the engine, the exhaust system defining a first exhaust path and a second exhaust path separate from one another, the exhaust system comprising:
    a catalytic converter in fluid communication with the exhaust port of the at least one cylinder to receive exhaust gas therefrom;
    a main muffler downstream from and in selective fluid communication with the catalytic converter, the main muffler defining at least in part the first exhaust path;
    a hydrocarbon trap downstream from and in selective fluid communication with the catalytic converter, the hydrocarbon trap defining at least in part the second exhaust path, the hydrocarbon trap comprising a hydrocarbon trapping material to adsorb hydrocarbon from exhaust gas flowing therethrough;
    a pre-muffler disposed upstream from the main muffler and the hydrocarbon trap, the pre-muffler defining a pre-muffler chamber, the catalytic converter being in fluid communication with the pre-muffler chamber such that exhaust gas flows from the catalytic converter to the pre-muffler chamber before flowing through one of the first exhaust path and the second exhaust path;
    at least one exhaust path valve operable to selectively obstruct the first exhaust path and the second exhaust path to prevent exhaust gas from the catalytic converter flowing through the first exhaust path and the second exhaust path respectively, the pre-muffler enclosing the at least one exhaust path valve, each of the at least one exhaust path valve being movable between a first exhaust path position and a second exhaust path position, the at least one exhaust path valve obstructing the second exhaust path in the first exhaust path position such that exhaust gas flows from the exhaust port of the at least one cylinder to the catalytic converter to the main muffler and to the atmosphere, the at least one exhaust path valve obstructing the first exhaust path in the second exhaust path position such that exhaust gas flows from the exhaust port of the at least one cylinder to the catalytic converter to the hydrocarbon trap and to the atmosphere;

an air intake system fluidly connected to the engine to feed air to the engine; and a purging conduit fluidly connected to the second exhaust path upstream from the hydrocarbon trap, the purging conduit being fluidly connected to the air intake system to permit air flow from the hydrocarbon trap into the air intake system via the purging conduit.

14. The engine assembly of claim 13, further comprising a connecting conduit fluidly connecting the pre-muffler to the hydrocarbon trap, the connecting conduit defining in part the second exhaust path, wherein:

the purging conduit extends from the connecting conduit; and a diameter of the connecting conduit is greater than a diameter of the purging conduit.

15. The engine assembly of claim 13, further comprising a purge valve operable to selectively fluidly communicate the air intake system with the second exhaust path via the purging conduit, the purge valve being movable between an exhaust position and a purging position, wherein:

in the exhaust position:
the purge valve blocks flow through the purging conduit;
the at least one exhaust path valve is in the second exhaust path position in order for exhaust gas to flow out of the exhaust system through the second exhaust path; and in the purging position:
the purge valve allows flow through the purging conduit;
the at least one exhaust path valve is in the first exhaust path position in order for exhaust gas to flow out of the exhaust system through the first exhaust path; and
ambient air is drawn into the second exhaust path via the hydrocarbon trap and flows to the air intake system via the purging conduit thereby providing the air intake system with hydrocarbon purged from the hydrocarbon trap.

16. The engine assembly of claim 15, wherein:
each of the at least one cylinder defines an intake port;
the air intake system comprises a compressor in fluid communication with the intake port of the at least one cylinder and with the purging conduit; and
pressure produced by the compressor causes ambient air to be drawn into the second exhaust path via the hydrocarbon trap when the purge valve is in the purging position.

17. A method for operating an exhaust system of an engine assembly for a vehicle, the exhaust system defining a first exhaust path and a second exhaust path, the exhaust system comprising:

a catalytic converter;

a main muffler downstream from and in selective fluid communication with the catalytic converter, the main muffler defining at least in part the first exhaust path;

a hydrocarbon trap downstream from and in selective fluid communication with the catalytic converter, the hydrocarbon trap defining at least in part the second exhaust path, the hydrocarbon trap comprising a hydrocarbon trapping material to adsorb hydrocarbon from exhaust gas flowing therethrough;

an air intake system fluidly connected to the engine to feed air to the engine; and a purging conduit fluidly connected to the second exhaust path upstream from the hydrocarbon trap, the purging conduit being fluidly connected to the air intake system, the method comprising:
determining at least one operational parameter of the engine assembly;
selectively obstructing the first exhaust path and the second exhaust path based on the at least one operational parameter of the engine assembly, the first exhaust path being open when the second exhaust path is obstructed, the second exhaust path being open when the first exhaust path is obstructed,
exhaust gas flowing from the catalytic converter to the main muffler and to the atmosphere in response to the second exhaust path being obstructed,
exhaust gas flowing from the catalytic converter to the hydrocarbon trap and to the atmosphere in response to the first exhaust path being obstructed;
obstructing flow through the purging conduit in response to the first exhaust path being obstructed; and
permitting flow through the purging conduit in response to the second exhaust path being obstructed in order to draw ambient air into the second exhaust path via the hydrocarbon trap to provide the air intake system with hydrocarbon purged from the hydrocarbon trap.

18. The method of claim 17, wherein the at least one operational parameter of the engine assembly includes at least one of:
a rate of fuel consumption of the engine;
a temperature of a part of the engine assembly;
an amount of time elapsed since starting of the engine;
an amount of oxygen contained in exhaust gas discharged by the engine; and
a position of a throttle valve of an air intake system of the engine assembly.

19. The method of claim 17, wherein selectively obstructing the first exhaust path and the second exhaust path comprises moving at least one exhaust path valve between a first exhaust path position and a second exhaust path position, the at least one exhaust path valve obstructing the second exhaust path in the first exhaust path position such that exhaust gas flows from the catalytic converter to the main muffler and to the atmosphere, the at least one exhaust path valve obstructing the first exhaust path in the second exhaust path position such that exhaust gas flows from the catalytic converter to the hydrocarbon trap and to the atmosphere.

* * * * *